(12) United States Patent
Jayawardene et al.

(10) Patent No.: US 12,634,709 B2
(45) Date of Patent: May 19, 2026

(54) METHODS AND APPARATUS FOR DETECTING, MANAGING AND/OR MITIGATING INTERFERENCE BETWEEN NETWORKS WITHOUT THE NEED FOR A CENTRALIZED CONTROLLER

(71) Applicant: Charter Communications Operating, LLC, St. Louis, MO (US)

(72) Inventors: Diwelawatte PJ Jayawardene, Centennial, CO (US); Ramneek Bali, Aurora, CO (US); Manish Jindal, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 326 days.

(21) Appl. No.: 18/130,795

(22) Filed: Apr. 4, 2023

(65) Prior Publication Data

US 2024/0340650 A1 Oct. 10, 2024

(51) Int. Cl.
*H04W 16/14* (2009.01)
*H04W 24/08* (2009.01)
*H04W 56/00* (2009.01)

(52) U.S. Cl.
CPC ........... *H04W 16/14* (2013.01); *H04W 24/08* (2013.01); *H04W 56/0045* (2013.01)

(58) Field of Classification Search
CPC .. H04W 16/14; H04W 24/08; H04W 56/0045
USPC ......................................................... 455/454
See application file for complete search history.

(56) References Cited

U.S. PATENT DOCUMENTS

| | | | | |
|---|---|---|---|---|
| 9,748,989 | B1 * | 8/2017 | Freedman | H04B 1/12 |
| 2017/0201892 | A1 * | 7/2017 | Wen | H04B 7/0695 |
| 2018/0098289 | A1 * | 4/2018 | Visotsky | H04W 16/28 |
| 2021/0045130 | A1 * | 2/2021 | Tang | H04W 72/29 |

* cited by examiner

*Primary Examiner* — Michael R Neff
(74) *Attorney, Agent, or Firm* — Straub & Straub; Michael P. Straub; Stephen T. Straub

(57) ABSTRACT

Methods and apparatus for managing and/or mitigating interference between networks without the need for a centralized controller are described. Beams are used by a base station in various embodiments. The range of one or more beams on which excessive interference is detected is decreased. If beam range reduction reduces the detected interference on a beam to an acceptable level the base station will resume operation on the beam at the reduced range. On beams on which gain reduction is insufficient to bring the detected interference to an acceptable level and still provide a usable beam, the beam may be shut off and/or beam reshaping may be tried. When other steps to mitigate interference are insufficient, a base station attempts one or more timing adjustments to see if a timing change and/or adjustment of the TDD configuration results in reduced interference, e.g., by improving timing synchronization with an interfering signal source.

20 Claims, 17 Drawing Sheets

| FIGURE 3A |
| FIGURE 3B |
| FIGURE 3C |
| FIGURE 3D |
| FIGURE 3E |

METHODS AND APPARATUS FOR DETECTING, MANAGING AND/OR MITIGATING INTERFERENCE BETWEEN NETWORKS WITHOUT THE NEED FOR A CENTRALIZED CONTROLLER

FIELD

The present invention relates to communications systems and, more particularly, to methods and apparatus for reducing and/or managing interference between communications systems without the need for a centralized spectrum access system or other centralized controller to control interference between different communications networks which share use of the same spectrum.

BACKGROUND

There are several problems which need to be addressed when devices of different networks desire to use the same spectrum particularly with regard to mid-band spectrum (spectrum within the 1 GHz-6 GHz range). A first problem involves maintaining time-division-duplexing (TDD) sync. Generally, mid-band spectrum (especially 3 GHZ) requires the ability to maintain TDD sync across the entirety of the band or else different networks sharing the spectrum may suffer mutual degradation of service. For example, consider an example of a 3.1 GHz-4.0 GHz band, the timing sync should be maintained from 3.1 GHz-4.0 GHz regardless of the power disparity within sub-sections of the band or downlink signals from one network will interfere with the uplink signals of another network due to the mismatch in timing between the networks.

A second problem involves interference avoidance. Network operators are to respect existing incumbents in the band (e.g., department of Defense (DOD) devices). Thus, incumbent operators are granted their independence to use the band and their operations are to be protected when the same spectrum is opened up for commercial operation, e.g., by non-incumbent networks.

Typically, in mid-band spectrum a centralized approach is used to protect incumbent operators. In such an approach a spectrum administrator, e.g., a spectrum access system (SAS), provides overall control of the shared spectrum and manages devices corresponding to a plurality of different networks, e.g., with regard to maintaining synchronization for networks, controlling base station power levels, deciding portions of spectrum which may be used by particular base stations, and managing overall interference. Such an approach requires non-incumbent networks to communicate with and be controlled by an SAS. It would be desirable if methods and/or apparatus could be developed which would allow incumbent and non-incumbent operators to share spectrum without the need to implement an SAS but while still taking steps to avoid, reduce or limit interference to incumbent operators without the need for the incumbent operators to change their network operation.

Accordingly, it should be appreciated that there is a need for new methods and apparatus which can address and/or avoid one or more of the above discussed problems relating to managing interference and/or maintaining synchronization in an environment in which different networks share spectrum, in a decentralized manner, e.g., without the use of an overall spectrum administrator and without the need or an incumbent user to make changes to incumbent network operation.

2

SUMMARY

Various embodiments are directed to interference avoidance methods and apparatus, implemented by base stations, e.g., sector gNBs of a first network supporting beamforming, in which the base stations use mid-band spectrum, which is being shared with devices corresponding to other networks, said interference avoidance being accomplished by the base stations without the use of a spectrum administrator.

In various embodiments base stations with beamforming capability are used. The base stations may be, and often are, sector base stations. In the case of sector base stations, each sector base station is managed separately from an interference and beam management perspective. Base station timing is controlled to be synchronized with other devices, e.g., base stations, in the network to which the base station belongs.

In some embodiments, e.g., at a sector base station of a first network operator, a wide control beam is used for control signaling and narrower user beams are used to communicate user data and/or other information to/from devices, e.g., UEs (User Equipment devices).

Interference on the control beam is determined and when determined to be over a control beam interference threshold, interference on individual user beams is determined. The determined interference on each individual user beam is compared to a user beam interference threshold, e.g., max permitted user beam interference level. When the interference on a user beam is determined to be over the user beam interference threshold, steps are taken to try and continue operation given the excessive interference detected on one or more user beams.

In some embodiments the range of one or more user beams, on which excessive interference is detected, is decreased, e.g., by reducing a gain associated with the user beam or beams on which interference above the user beam maximum interference level threshold was detected. As the gain associated with a user beam is decreased, the detected interference on the user beam should also decrease, assuming the output of the interference source is constant. The gain reduction will also decrease the interference caused to other devices when the user beam with the reduced gain is used to transmit to user devices. If beam gain reduction reduces the detected interference on a user beam to an acceptable level, e.g., below the maximum user beam interference level, the base station will resume operation on the user beam at the reduced power level.

On user beams on which gain reduction is insufficient to bring the detected interference to an acceptable level and still provide a usable beam, the beam may be shut off and/or beam reshaping may be tried to avoid or reduce the interference in a particular direction.

In cases where beam gain reduction, beam shut off and/or beam reshaping results in reduced base station performance, e.g., sector performance, to a point where the sector base station can not properly support the data needs of user devices being serviced by the base station, the base station attempts one or more timing and/or TDD configuration adjustments. The timing adjustments may, and sometimes do, include one or more of a timing advance or a timing delay while a TDD configuration adjustment may, and sometimes does, involve altering the number of uplink and/or downlink slots in a TDD configuration being used and/or the location of uplink and/or downlink slots in a TDD structure being used. (i.e. the resource allocation between the unlink and downlink transmissions) or delay can The adjustments are made to see if a timing and/or TDD configuration change can result in reduced interference, e.g., by improving timing sync, which can include TDD configuration synchronization, with the interfering signal source such as a device, e.g., a second base station of a second network over which the sector base station of the first network has no control.

After a timing adjustment, interference measurements are again made. If a timing adjustment is successful in reducing interference, the sector base station implements the timing adjustment. The sector base station implementing the timing change signals other devices, e.g., other sector base stations, in the same network (e.g., first network) to make similar timing changes. Thus, timing synchronization is maintained between devices in the network in which the timing change is made.

Since timing changes can be disruptive to network operation in at least some embodiments timing adjustments are made only after one or more other attempts, e.g., through gain, beam shape and/or beam turnoff, provide insufficient interference reduction results or reduce the capacity of a sector base station to an unacceptable level of data throughput. In other embodiments timing synchronization changes are implemented and/or considered without having to try beam gain, shaping and/or turn off before trying timing synchronization changes.

Using one or more of the steps described herein, interference between networks can be managed and/or timing synchronization achieved with another network, e.g., an interfering network, which may be an incumbent network or higher priority network, without requiring the interfering network to make changes to its operation.

The various features described herein can be used alone or in combination. Accordingly, the particular described exemplary sequence while having benefits in some applications is not to be interpreted as the only possible sequence of steps.

Some embodiments are directed to interference avoidance methods and apparatus, implemented by base stations, e.g., sector gNBs of a first network supporting beamforming, in which the base stations use mid-band spectrum, which is being shared with devices corresponding to other networks, said interference avoidance being accomplished by the base stations without the use of a spectrum administrator.

One exemplary method is directed to a method of operating a first base station, in accordance with some embodiments, includes measuring interference received on user beams; detecting, based on measured user beam interference, interference over an acceptable level on one or more user beams; reducing the range of the one or more user beams upon which interference was detected over the acceptable level; measuring interference received on the user beams after reducing the range of the one or more user beams upon which interference was detected over the acceptable level; and determining if user beam interference is over the acceptable level on one or more of the user beams after reducing the range of the one or more user beams upon which interference was previously detected over the acceptable level; and taking an interference mitigation action if it is determined that user beam interference remains over the acceptable level on one or more of the user beams.

Numerous variations on the described methods and apparatus are possible and, while several embodiments are described in detail, it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 3 comprises the combination of FIG. 3A, FIG. 3B, FIG. 3C, FIG. 3D and FIG. 3E.

DETAILED DESCRIPTION

Figure 1:
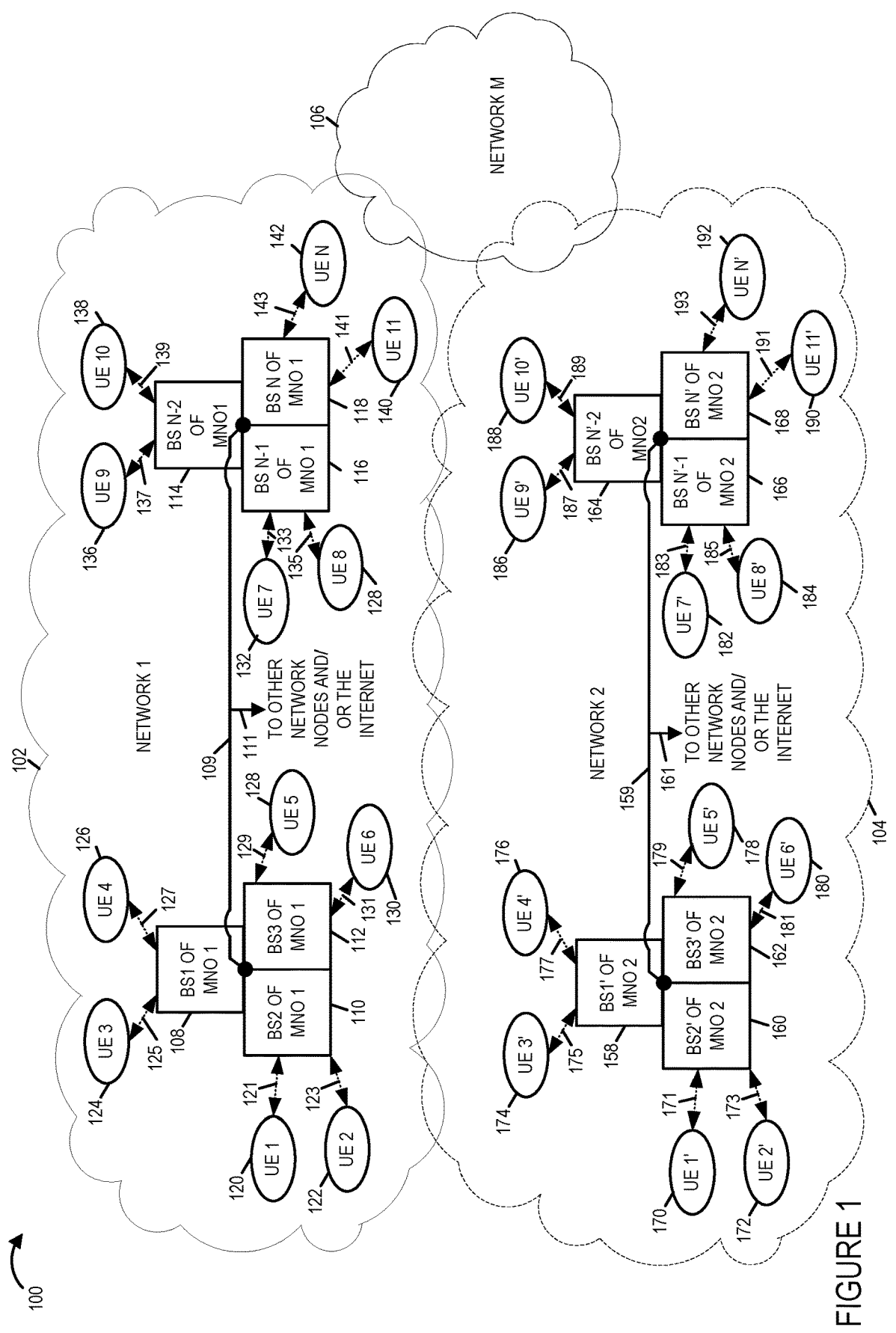
FIG. 1 is a drawing of an exemplary communications system including a network including base stations implemented to perform interference detection and remediation methods in accordance with an exemplary embodiment of the present intervention.

FIG. 1 is a drawing of an exemplary communications system 100. Exemplary communications system 100 includes a plurality of networks (network 1 102, network 2 104, . . . , network M 106). Network 1 102, which corresponds to mobile network operator (MNO) 1, includes a plurality of base stations (BS1 108, BS2 110, BS 3 112, . . . , BS N-2 114, BS N-1 116, BS N 118). In some embodiments the base stations (108, 110, 112, . . . , 114, 116, 118) are sector base stations supporting beamforming. Each of the base stations (108, 110, 112, . . . , 114, 116, 118) are implemented to perform interference detection and remediation methods in accordance with an exemplary embodiment of the present intervention. Network 1 102 further includes a plurality of user equipments (UEs) (UE 1 120, UE 2 122, UE 3 124, UE 4 126, UE 5 128, UE 6 130, UE 7 132, UE 8 134, UE 9 136, UE 10 138, UE 11 140, . . . , UE N 142). At least some of the UEs (120, 122, 124, 126, 128, 130, 132, 134, 136, 138, 140, . . . , 142) are mobile devices which may move throughout network 1 104 and be connected to a different base station at different times. The base station stations (BS1 108, BS2 110, BS 3 112), e.g., a first set of MNO 1 massive MIMO sector base stations supporting beamforming, are coupled together at a first common location site. The base station stations (BS N-2 114, BS N-1 116, BS N 118), e.g., a second set of MNO 1 massive MIMO sector base stations supporting beamforming, are coupled together at a second common location site. The group of base stations (108, 110, 112) are coupled to the group of base stations (114, 116, 118) via communications link 109, e.g., a portion of a backhaul network. Communications link 109 is coupled, via connection 111 to other network nodes and/or the Internet. UE 1 120 and UE 2 122 are coupled to BS 2 110 via wireless communications links (121, 123), respectively. UE 3 124 and UE 4 126 are coupled to BS 1 108 via wireless communications links (125, 127), respectively. UE 5 128 and UE 6 130 are coupled to BS 3 112 via wireless communications links (129, 131), respectively. UE 7 132 and UE 8 134 are coupled to BS N-1 116 via wireless communications links (133, 135), respectively. UE 9 136 and UE 10 138 are coupled to BS N-2 114 via wireless communications links (137, 139), respectively. UE 11 140 and UE N 142 are coupled to BS N 118 via wireless communications links (141, 143), respectively.

Network 2 102, which corresponds to MNO 2, includes a plurality of base stations (BS1' 158, BS2' 160, BS3' 162, . . . , BS N'-2 164, BS N'-1 166, BS N' 168). In some embodiments the base stations (158, 160, 162, . . . , 164, 166, 168) are sector base stations. Network 2 104 further includes a plurality of user equipments (UEs) (UE 1' 170, UE 2' 172, UE 3' 174, UE 4' 176, UE 5' 178, UE 6' 180, UE 7' 182, UE 8' 184, UE 9' 186, UE 10' 188, UE 11' 190, . . . , UE N' 192) At least some of the UEs (170, 172, 174, 176, 178, 180, 182, 184, 186, 188, . . . , 190) are mobile devices which may move throughout network 2 104 and be connected to a different base station at a different time. The base station stations (BS1' 158, BS2' 160, BS 3' 162), e.g., a first set of MNO 2 sector base stations, are coupled together at third common location site. The base station stations (BS N'-2 164, BS N'-1 166, BS N' 168), e.g., a second set of MNO 2 sector base stations, are coupled together at a fourth common location site. The group of base stations (158, 160, 162) are coupled to the group of base stations (164, 166, 168) via communications link 159, e.g., a portion of a backhaul network. Communications link 159 is coupled, via connection 161 to other network nodes and/or the Internet. UE 1' 170 and UE 2' 172 are coupled to BS 2' 160 via wireless communications links (171, 173), respectively. UE 3' 174 and UE 4' 176 are coupled to BS 1' 158 via wireless communications links (175, 177), respectively. UE 5' 178 and UE 6' 180 are coupled to BS 3' 162 via wireless communications links (179, 181), respectively. UE 7' 182 and UE 8' 184 are coupled to BS N-1 166 via wireless communications links (183, 185), respectively. UE 9' 186 and UE 10' 188 are coupled to BS N'-2 164 via wireless communications links (187, 189), respectively. UE 11' 190 and UE N' 192 are coupled to BS N' 168 via wireless communications links (191, 193), respectively.

Base stations (108, 110, 112, . . . , 114, 116, 118) in network 1 102 may, and sometimes do, desire to use the same spectrum (e.g., a shared band of TDD spectrum or a portion of a shared band of TDD spectrum) with base stations of other networks, e.g., adjacent network, partially or fully overlapping networks, e.g., network 2 104 and/or network M 106. Implemented timing structures of two different networks (e.g., network 1 102 and network 2 104) may be different and/or may not be synchronized with respect to one another. Wireless communications by one network, e.g., network 2 104, may be viewed as interference from the perspective of another network, e.g., network 1 102.

In accordance with a feature of the current invention, a base station of network 1, e.g., BS 3 112, measures interference detected on a control beam and determines if the detected level of interference on the control beam is above an acceptable control beam maximum interference threshold. If the measured interference on the control beam is determined to be above the acceptable control beam maximum interference threshold, then the base station proceeds to measure interference (e.g., UL RSSI) on each of a set of user beams, in an attempt to more precisely identify one or more smaller (narrower) regions of unacceptable interference. Each of the user beam interference determinations are compared to a user beam maximum interference threshold. If the interference on a particular user beam is determined to be above the threshold, then the gain controlling the user beam is adjusted, e.g., reduced incrementally, to reduce the range of the user beam, and the interference on the user beam is again measured to determine if the detected interference is now acceptable. A user beam, corresponding to a very high level of detected interference, may be, and sometimes is, completely turned-off, e.g., in a case where the lowest usable gain setting for the user beam still results in an unacceptable level of detected interference on the user beam. In some embodiments, one or more user beams may be modified, reshaped, to reduce detected user beam interference. In some embodiments, the base station of network 1, e.g., BS 3 112 adjusts its TDD timing structure, e.g., incrementally, in order to attempt to synchronize with respect to the timing structure being used by an interfering base station of another network, e.g., BS1' 158 of network 2' 104. The implementation of the exemplary methods in accordance with the present invention allows the base stations in network 1, e.g., BS 3 112, to determine and make power level adjustments, e.g. user beam adjustments, and/or timing adjustments, e.g., timing synchronization adjustments, to self-manage interference, thus allowing the base station to receive UL signals from UEs being serviced by the base station, using shared spectrum (e.g., shared mid-band spectrum) without the need for management and control by a spectrum access system (SAS) and without having to implement a listen-before-talk (LBT) approach.

Figure 2A:
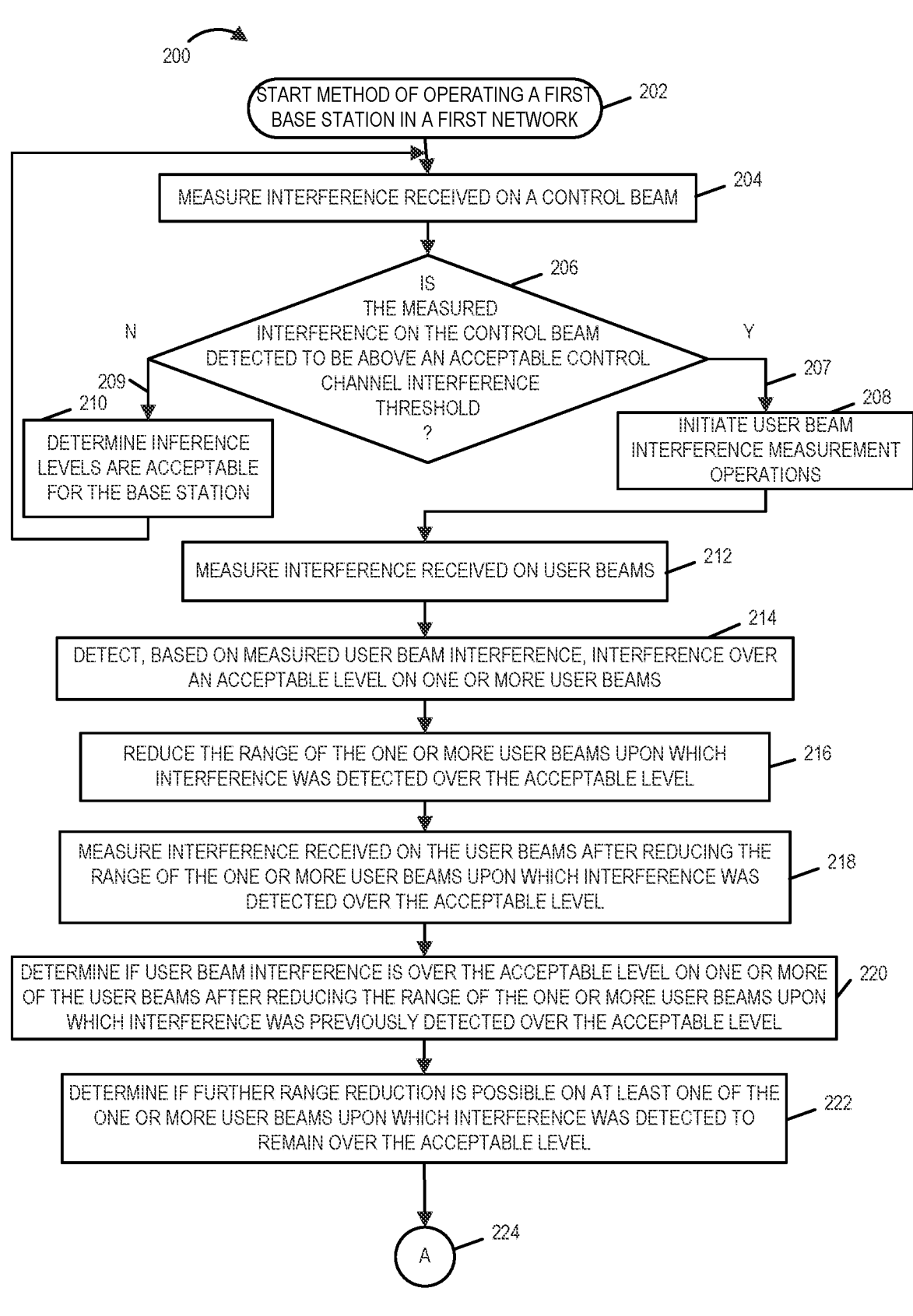
FIG. 2A is a first part of a flowchart of an exemplary method of operating a first base in a first network to measure interference and take interference remediation actions in accordance with an exemplary embodiment.
Figure 2B:
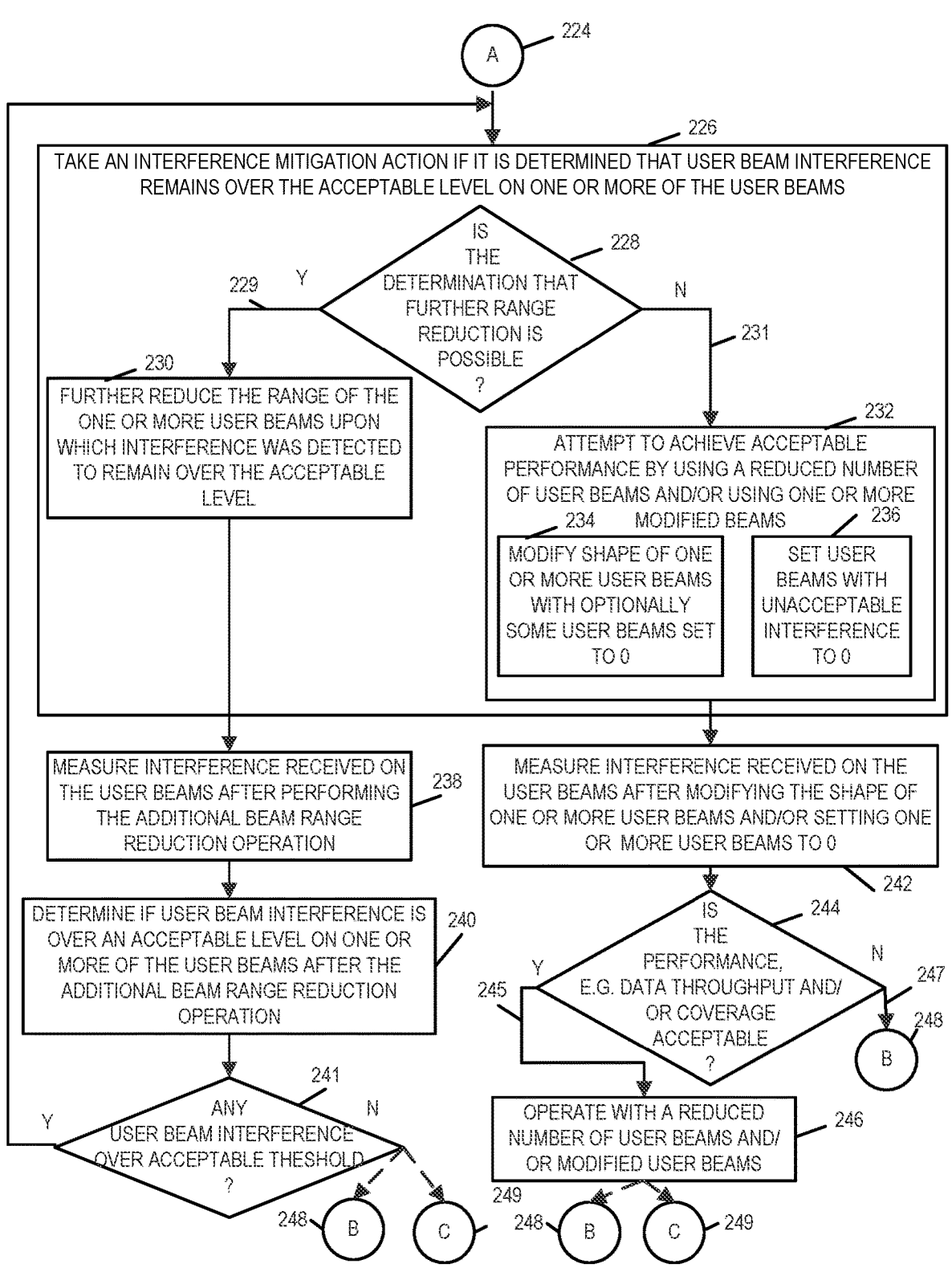
FIG. 2B is a second part of a flowchart of an exemplary method of operating a first base in a first network to measure interference and take interference remediation actions in accordance with an exemplary embodiment.
Figures 2, 2A, 2B, 2C:
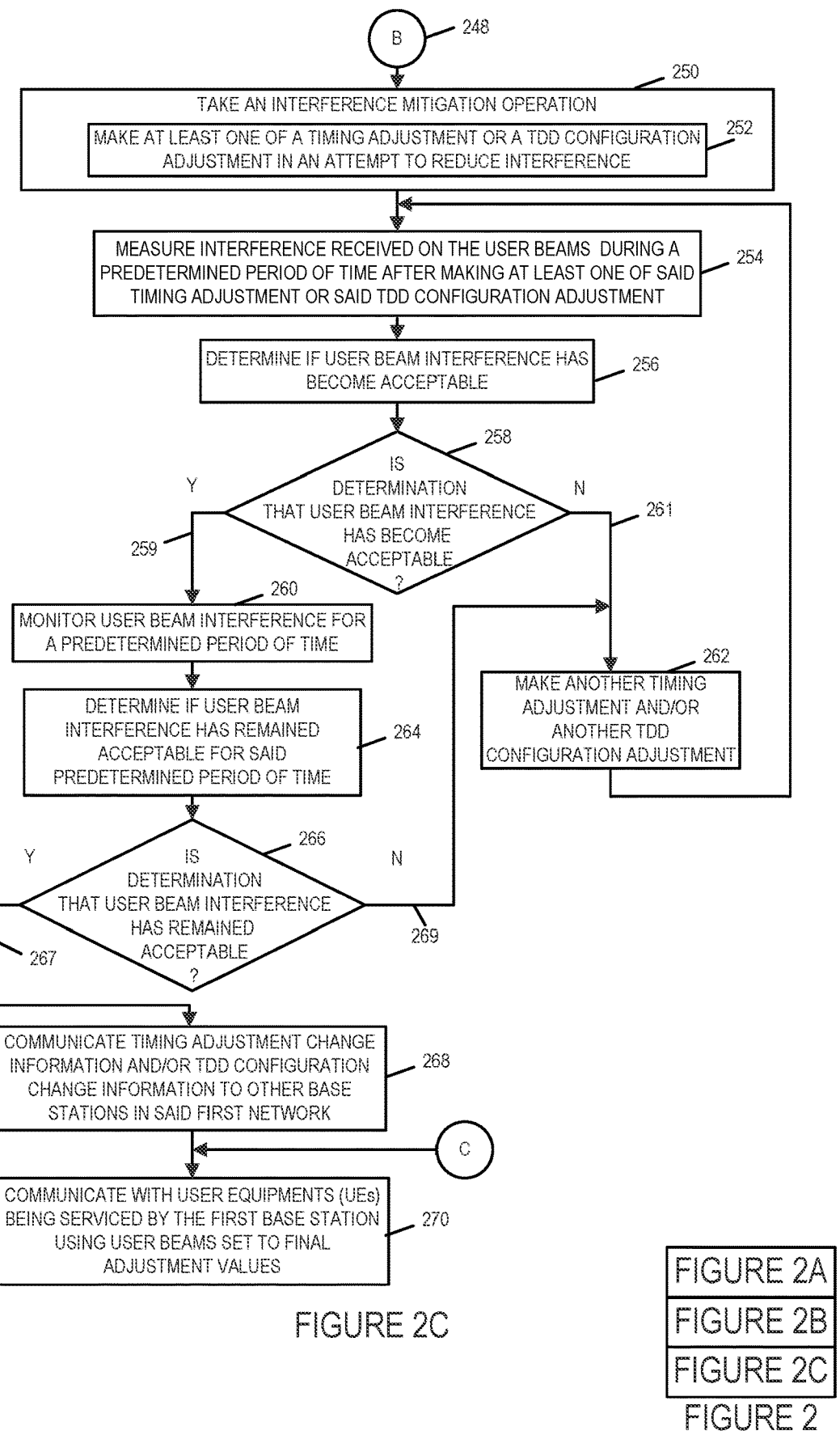
FIG. 2C is a third part of a flowchart of an exemplary method of operating a first base in a first network to measure interference and take interference remediation actions in accordance with an exemplary embodiment.
FIG. 2 comprises the combination of FIG. 2A, FIG. 2B and FIG. 2C.
Figure 3A:
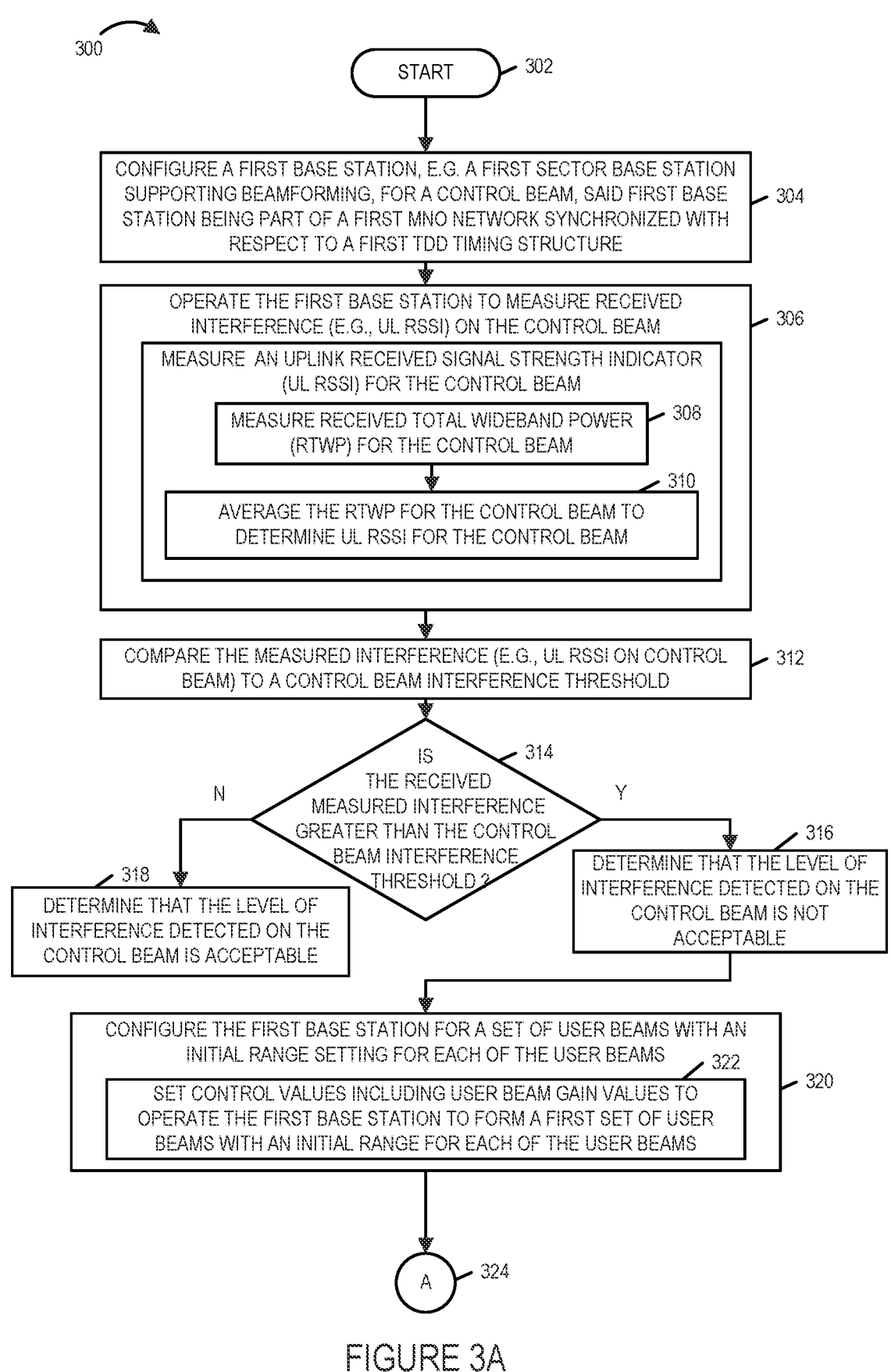
FIG. 3A is a first part of a flowchart of an exemplary method of operating a first base station, e.g., a first base station supporting beamforming, to measure interference and take interference remediation actions in accordance with an exemplary embodiment.
Figure 3B:
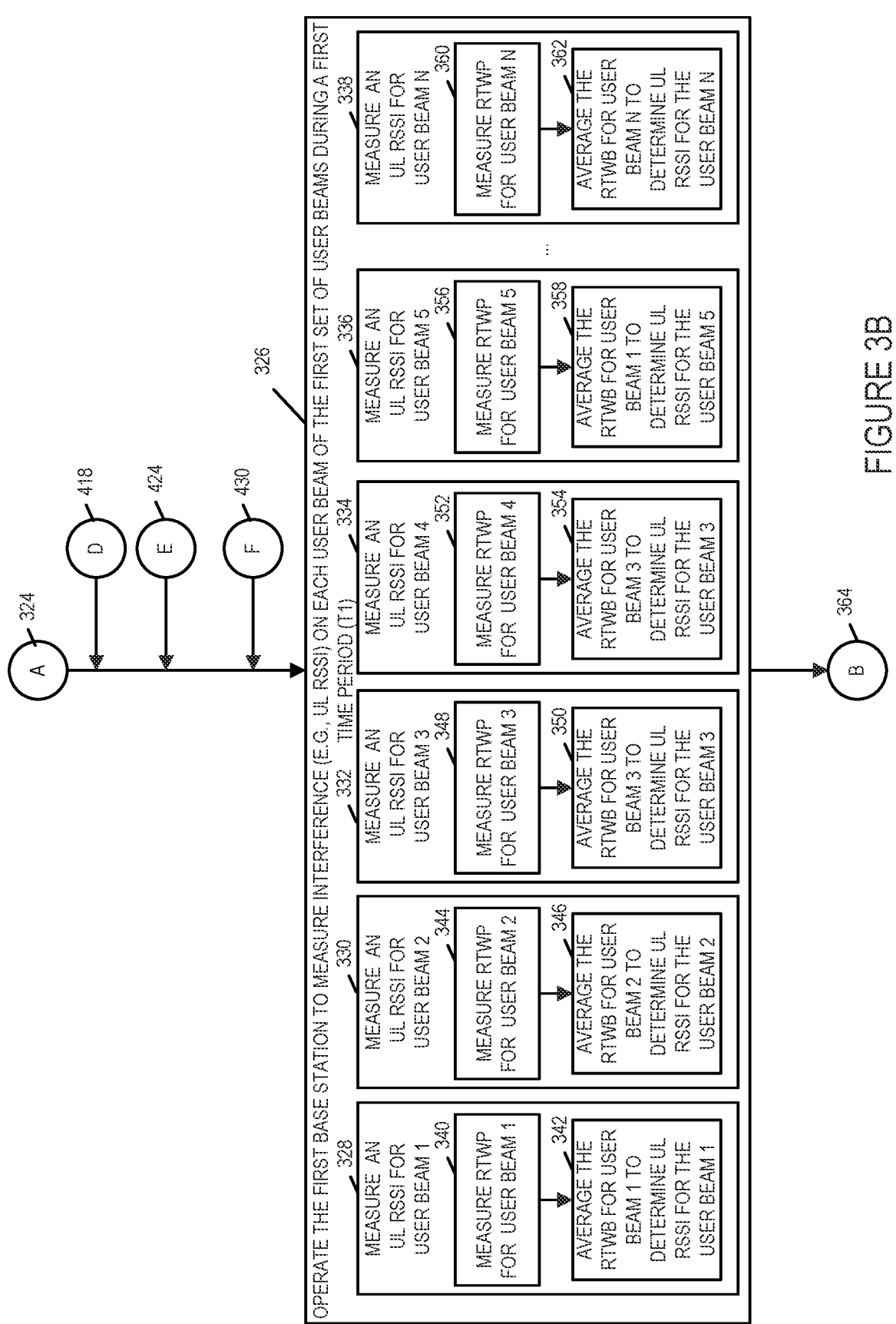
FIG. 3B is a second part of a flowchart of an exemplary method of operating a first base station, e.g., a first base station supporting beamforming, to measure interference and take interference remediation actions in accordance with an exemplary embodiment.
Figure 3C:
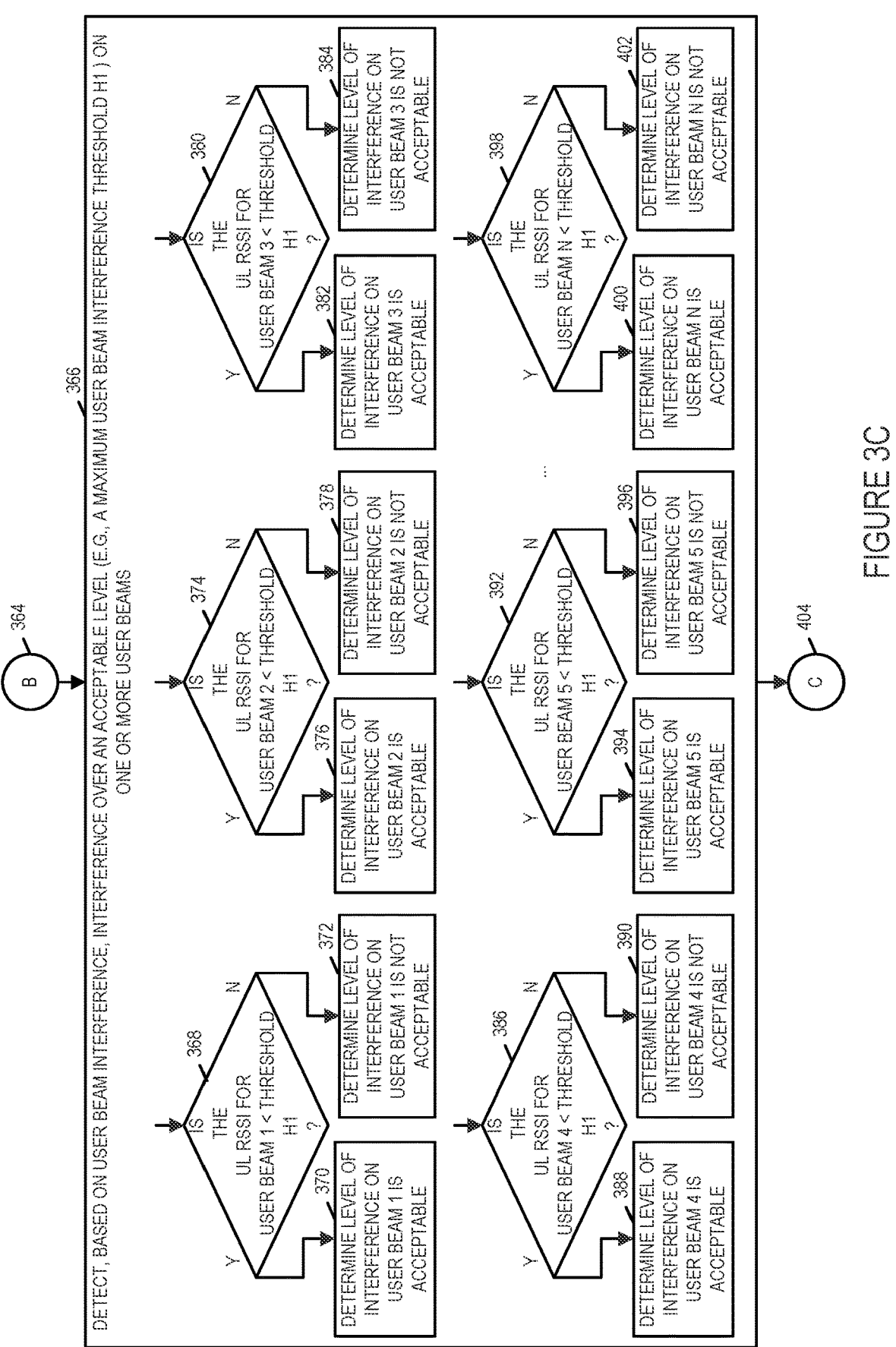
FIG. 3C is a third part of a flowchart of an exemplary method of operating a first base station, e.g., a first base station supporting beamforming, to measure interference and take interference remediation actions in accordance with an exemplary embodiment.
Figure 3D:
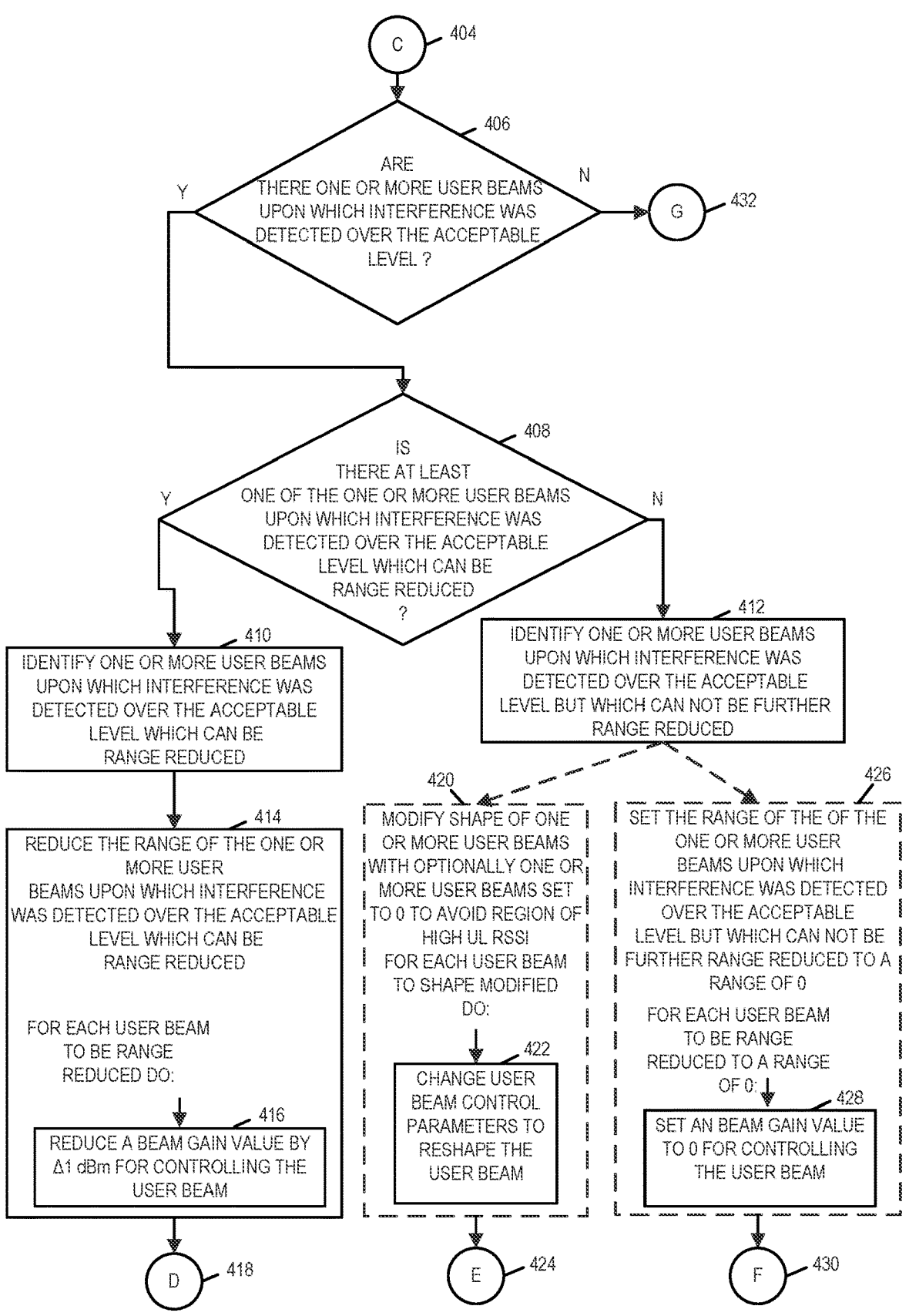
FIG. 3D is a fourth part of a flowchart of an exemplary method of operating a first base station, e.g., a first base station supporting beamforming, to measure interference and take interference remediation actions in accordance with an exemplary embodiment.
Figure 3E:
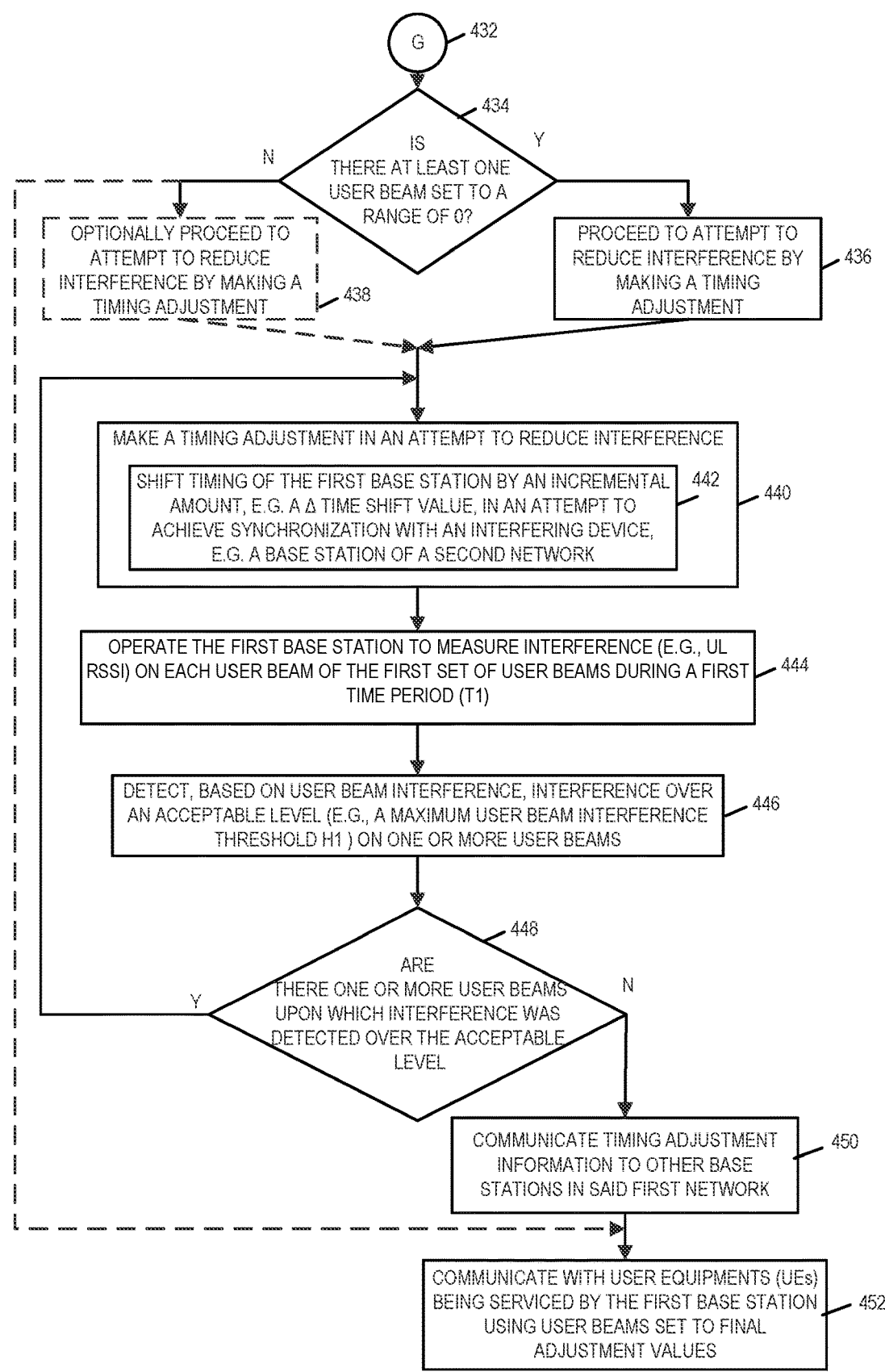
FIG. 3E is a fifth part of a flowchart of an exemplary method of operating a first base station, e.g., a first base station supporting beamforming, to measure interference and take interference remediation actions in accordance with an exemplary embodiment.

FIG. 2, comprising the combination of FIG. 2A, FIG. 2B and FIG. 2C, is a flowchart 200 of an exemplary method of operating a first base, e.g., a first sector massive MIMO base station supporting beamforming, in a first network in accordance with an exemplary embodiment. The first base station is, e.g., one of the base stations (108, 110, 112, ..., 114, 116, 118) of network 1 102 of FIG. 1.

Operation starts in step 202 in which the first base station is powered on an initialized and proceeds to step 204.

In step 204 the first base station measures interference received on a control beam. Operation proceeds from step 204 to step 206. In step 206 the first base station determines if the measured interference detected on the control beam is above an acceptable control channel interference threshold. Arrow 207 signifies the first base station has determined that the measured interference detected on the control beam is above the acceptable control channel interference threshold. Arrow 209 signifies the first base station has determined that the measured interference detected on the control beam is not above the acceptable control channel interference threshold. If the determination is that the measured interference detected on the control beam is not above the acceptable control channel interference, then operation proceeds from step 206 to step 210, in which the first base station determines that the interference levels are acceptable for the first base station, and operation proceeds from step 210 to the input of step 204, for another interference measurement on the control beam at a later point in time. However, if the determination of step 206 is that the measured interference detected on the control beam is above the acceptable control channel interference, then operation proceeds from step 206 to step 208, in which the first base station initiates user beam interference measurement operations. Operation proceeds from step 208 to step 212.

In step 212 the first base station measures interference received on user beams, e.g., during a first time period (t1) used for measuring interference on user beams. For example, the first base station measures interference for each user beam of a set of user beams (e.g., a set of user beams including a first user beam, a second user beam, ..., an Nth user beam). For example, in some embodiments, for each user beam, the first base station measures received total wideband power (RTWP) and determines an uplink received signal strength indicator (UL RSSI) value from the RTWP, e.g., average of the RTWP on the beam. In some embodiments, step 212 includes measuring interference on a first user beam including: receiving wireless signals on the first user beam, measuring RTWP of the received wireless signals on the first user beam, and averaging the RTWP for the first user beam to obtain an interference value for the first user beam, said interference value being an UL RSSI value for the first user beam. Similar measurements are performed for each of the other user beams (user beam 2, user beam 3, ..., user beam N) in the set of user beams. Operation proceeds from step 212 to step 214.

In step 214, the first base station detects, based on user beam interference, interference over an acceptable level (e.g., maximum user beam interference threshold h1) on one or more user beams. Thus, in step 214 the first base station compares the determined measured interference value for each user beams to a user beam interference threshold (e.g., h1), and determines which user beam(s) have a received interference value exceeding the threshold (a maximum acceptable interference threshold). Operation proceeds from step 214 to step 216. In step 216 the first base station reduces the range of the one or more user beams upon which interference was detected over the acceptable level. In various embodiments, the user beam range reduction is achieved by changing a beam gain setting value, e.g., by a predetermined incremental amount, e.g., by reducing a user beam gain value in a step of Δ1 dB. In various embodiments changing a beam gain setting value includes or triggers changing one or more antenna gain values. Operation proceeds from step 216 to step 218. In step 218 the first base station measures interference received on the user beams after reducing the range of the one or more user beams upon which the interference was detected over the acceptable level. Operation proceeds from step 218 to step 220. In step 220 the first base station determines if user beam interference is over the acceptable level on one or more of the user beams after reducing the range of the one or more user beams upon which interference was previously detected over the acceptable level. Operation proceeds from step 220 to step 222. In step 222 the first base station determines if further range reduction is possible on at least one of the one or more user beams upon which interference was detected to remain over the acceptable level (e.g., was a beam power level reduced to the minimum amount without reaching an acceptable level of interference). In some embodiments, a user beam may only be reduced to a minimum level; reductions beyond the minimum level would result in a user beam that is not practical to be used for supporting communications by the base station (e.g., not enough range coverage and/or not enough throughput can be supported).

Operation proceeds from step 222 via connecting node A 224, to step 226. In step 226 the first base station takes an interference mitigation action if it is determined that user beam interference remains over the acceptable level on one or more of the user beams. Step 226 includes steps 228, 230 and 232. In step 228, if the determination of step 222 is that further range reduction is possible on at least one of the one or more user beams upon which interference was detected to remain over the acceptable level, then operation proceeds from step 228 to step 230; otherwise, operation proceeds from step 228 to step 232. Arrow 229 signifies that the determination is that further range reduction is possible on at least one of the one or more beams upon interference was detected to be remain above the acceptable level. Arrow 231 signifies that the determination is that further range reduction is not possible on at least one of the one or more beams upon interference was detected to be remain above the acceptable level. In step 230 the first base station further reduces the range of one or more user beams upon which interference was detected to remain over the acceptable level. Operation process from step 230 to step 238, in which the first base station measures interference on the user beams after performing the additional user beam range reduction operation. Operation proceeds from step 238 to step 240. In step 240 the first base station determines if user beam interference is over an acceptable level on one or more of the user beams after the additional beam range reduction operation. Operation proceeds from step 240 to step 241. In step 241 if the determination is that user beam interference is over an acceptable level on one or more of the user beams after the additional beam range reduction of step 230, then operation proceeds from step 241 to step 226. However, if the determination of step 240 is that none of the user beam has a measured interference above the acceptable threshold, then operation proceeds from step 241 to either of step 226, via connecting node B 248, or step 270, via connecting node C 249. In some embodiments, the first base station, after achieving acceptable user beam measured interference levels, proceeds to attempt to further reduce interference at the first base station by making timing adjustments, and in such an embodiment operation proceeds from step 241 via connecting node B 248 to step 250. In some other embodiments, the first base station, once it has achieved acceptable user beam measured interference levels, does not attempt to further reduce interference at the first base station by making timing adjustments, and in such an embodiment operation proceeds from step 241 via connecting node C 249 to step 270.

Returning to step 232, the first base station attempts to achieve acceptable performance (e.g., acceptable interference levels on user beams) using a reduced number of user beams and/or using one or more modified beams. Step 232 includes step 234 and/or step 236. In step 234 the first base station modifies the shape of one or more user beams with optionally some user beams set to 0. In step 236 the first base station sets user beams with unacceptable interference to 0 (e.g., the first base station turns-off user beams upon which an unacceptable level of interference was detected). Operation proceeds from step 232 to step 242.

In step 242 the first base station measures interference received on the user beams after modifying the shape of one or more user beams and/or setting one or more user beams to 0. Operation proceeds from step 242 to step 244. In step 244 the first base station determines if the performance, e.g., data throughput and/or coverage, is acceptable. Arrow 245 signifies that the determination is that the performance is acceptable. Arrow 247 signifies that the determination is that the performance is not acceptable. If the determination of step 244 is the performance is acceptable, e.g., measured interference on user beams is now below an acceptable threshold on each of the user beams and coverage based on the limited number of user beams and/or modified (e.g., re-shaped) user beams is acceptable, then operation proceeds from step 244 to step 246, in which the first base station operates with a reduced number of user beams and/or with the modified user beams. In some embodiments, operation proceeds from step 246, via connecting node C 247 to step 270. In some other embodiments, operation proceeds from step 246, via connecting node B 248 to step 250. In some embodiments, the first base station, after determining performance is acceptable with the implementation of modified user beams and/or one or more user beams turned-off (e.g., set to 0), proceeds to attempt to further reduce interference at the first base station by making timing adjustments, and in such an embodiment operation proceeds from step 246 via connecting node B 248 to step 250. In some other embodiments, the first base station, once it has determined performance is acceptable with the implementation of modified user beams and/or one or more user beams turned-off (e.g., set to 0), does not attempt to further reduce interference at the first base station by making timing adjustments, and in such an embodiment operation proceeds from step 246 via connecting node C 249 to step 270.

Returning to step 244, if the determination of step 244 is that the performance is not acceptable, then operation proceeds from step 244, via connecting node B 248, to step 250. In step 250 first base station takes an interference mitigation operation. Step 250 includes step 252, in which the first base station makes at least one of a timing adjustment, e.g., a timing adjustment by a predetermined amount or a timing adjustment by a determined amount based on detected signals of another base station, or a TDD configuration adjustment in an attempt to reduce detected interference. In some embodiments, the method includes making said timing adjustment, said timing adjustment being an advance or delay in the first base station timing. In some embodiments, the method includes making said TDD configuration adjustment, said TDD configuration adjustment including at least one of: i) altering a number of slots included in the TDD configuration being used by the first base station, ii) altering the number of downlink slots in the TDD configuration being used by the first base station, or iii) altering the location of uplink and downlink slots in the TDD configuration being used by the first base station. In some embodiments, the timing adjustment is by a small predetermined amount, without the first base station being aware of the actual timing of the high interfering base station from the other network. In some embodiments, the first base station identifies a base station of a second network as a high interference source, and the first base station adjusts its timing to attempt to synchronize its timing structure with respect to the timing being used by the second base station. The second approach results in a quicker adjustment to timing synchronization between the two networks but requires additional precise measurements performed by the first base station using received signals from the interfering base station. Operation proceeds from step 250 to step 254.

In step 254 the first base station measures interference received on the user beams during a predetermined time period of time after making at least one of the timing adjustment (e.g., shift timing used to control uplink/downlink timing) or said TDD configuration adjustment. Operation proceeds from step 254 to step 256. In step 256 the first base station determines if the interference measured on the user beams has become acceptable. In some embodiments, e.g., acceptable interference means measured interference on each of the user beams which is below the user beam interference threshold. In some embodiments, acceptable interference means a lower level of interference (less interference, e.g., by at least a predetermined amount) than was achieved via only modifying user beam gains or modifying user beams. In some embodiments, the timing adjustment is used to satisfy a maximum level of acceptable interference requirement for each user beam. In some embodiments, the timing adjustment is used to achieve a lower level of interference below the maximum level of acceptable interference requirement for each user beam.

Operation proceeds from step 256 to step 258. In step 258, if the determination is that the user beam interference has become acceptable, then operation proceeds from step 258 to step 260. However, if the determination is that user beam interference is not acceptable, then operation proceeds from step 258 to step 262. Arrow 259 signifies that the first base station has determined that the user beam interference has become acceptable. Arrow 261 signifies that the first base station has determined that the user beam interference has not become acceptable. In step 262 the first base station makes another timing adjustment. Operation proceeds from step 262 to the input of step 254 for additional set of interference measurements of the user beams and subsequent evaluation of the results with regard to the user beam interference threshold.

Returning to step 260, in step 260 the first base station monitors user beam interference for a predetermined period of time. Operation proceeds from step 260 to step 264. In step 264 the first base station determines if user beam interference has remained acceptable for said predetermined period of time. Operation proceeds from step 264 to step 266. In step 266 if the determination is that the user beam interference has not remained acceptable, then operation proceeds from step 266 to step 262. Arrow 269 indicates that the first base station has determined that the user beam interference has not remained acceptable for said predetermined period of time. In step 262 the first base station makes another timing adjustment and/or another TDD configuration adjustment. However, if the determination is that the user beam interference has remained acceptable for said predetermined period of time, then operation proceeds from step 266 to step 268. Arrow 267 signifies that the first base station has determined that user beam interference has remained acceptable for said predetermined period of time. In step 268 the first base station communicates timing adjustment change information and/or TDD configuration change information to other base stations in the first network. Operation proceeds from step 268 to step 270. In step 270 the first base station communicates with user equipments (UEs) being serviced by the first base station using the user beam set to final adjustment values.

In various embodiments, the first base station is part of a first network and the interference which is being measured includes interference from devices in a second network.

In some embodiments, step 212 of measuring interference on user beams is initiated in response to detecting control channel (control beam) interference above an acceptable control channel (control beam) interference threshold, and step 212 is used to identify specific user beams corresponding to a direction from which unacceptable interference is being received. In some such embodiments, the control channel interference threshold is set sufficiently low to ensure that the measured control channel interference will be above the control channel interference threshold if any one of the user beams is above the user beam interference threshold.

In various embodiments, the step of measuring interference on user beams is performed during a period of time in which the first base station is controlled not to transmit to UEs being serviced by the first base station and UEs being serviced by the first base station are being controlled not to transmit to the first base station.

In some embodiments, the first base station is a sector base station supporting massive MIMO and beamforming.

In some embodiments, the first network is a first mobile network operator (MNO) network and the second network is a second MNO network. In some such embodiments, the first network is using a first TDD timing structure and the second network is using a second TDD timing structure, and the first network and second network are using at least some of the same mid-band spectrum (e.g., shared mid-band spectrum).

FIG. 3, comprising the combination of FIG. 3A, FIG. 3B, FIG. 3C, FIG. 3D and FIG. 3E, is a flowchart 300 of an exemplary method of operating a first base station, e.g., a first base station supporting beamforming, in accordance with an exemplary embodiment. In some embodiments, the first base station is a first sector massive MIMO base station supporting beamforming. In some embodiments, the first base station is one of a plurality of base stations which are part of a first network, e.g., a first mobile network operator (MNO) corresponding to a first service provider operator, and the first network base stations are timing synchronized with respect to first network time-division-duplex (TDD) timing structure. The first base station is, e.g., one of the base stations (108, 110, 112, . . . , 114, 116, 118) of network 1 102 of FIG. 1. In some such embodiments, device communications corresponding to second network may, and sometimes do, act as interference with regard to first network communications. The second communications network is, e.g., a second MNO network, e.g., network 104, corresponding to a second service provider operator. The first network and second network, e.g., adjacent networks, overlapping networks, or partially overlapping networks, are, e.g., using at least some of the same spectrum, e.g., a band of shared unlicensed spectrum, for communications. The timing structure being used by the second network, is not necessarily synchronized with respect to the timing structure of first network.

Operation of the exemplary method starts in step 302 in which the first base station is powered on and initialized. Operation proceeds from start step 302 to step 304. In step 304 the first base station, e.g., a first sector massive MIMO base station supporting beamforming, is configured for a control beam, said first base station being part of a first MNO network synchronized with respect to a first TDD timing structure. Operation proceeds from step 304 to step 306.

In step 306 the first base station is operated to measure received interference (e.g., uplink received signals strength indicator (UL RSSI) on the control beam. Step 306 includes step 307, in which the first base station is operated to measure an UL RSS for the control beam. Step 307 includes step 308 and step 310. In step 308 the first base station measures received total wideband power (RTWP) for the control beam. Operation proceeds from step 308 to step 310. In step 310 the first base station averages the RTWP for the control beam to determine UL RSSI for the control beam. Operation proceeds from step 306 to step 312.

In step 312 the first base station compares the measured interference, e.g., UL RSSI on the control beam, to a control beam interference threshold. Operation proceeds from step 312 to step 314. In step 314, if the measured interference (e.g., UL RSSI) on the control beam) is not greater than the control beam interference threshold, then operation proceeds from step 314 to step 318, in which the first base station determines that the level of interference detected on the control beam is acceptable. In some embodiments, determining that the level of interference detected on the control beam is acceptable implies that the first base station can operate using a set of user beam at predetermined nominal power levels, as UL RSSI on the set of user beams at the predetermined nominal power level is expected to be below an acceptable user beam interference threshold with regard to interference.

However, in step 314, if the measured interference (e.g., UL RSSI) on the control beam) is greater than the control beam interference threshold, then operation proceeds from step 314 to step 316, in which the first base station determines that the level of interference detected on the control beam is not acceptable. Operation proceeds from step 316 to step 320.

In step 320 the first base station is operated to configure the first base station for a set of user beams (user beam 1, user beam 2, user beam 3, user beam 4, user beam 5, . . . , user beam n) with an initial range setting (e.g., a nominal initial range setting) for each of the user beams. In some embodiments, the nominal initial range setting is the same for each of the beams in the set of user beams. Step 320 includes step 322. In step 322 the first base station sets control values including user beam gain values to operate the first base station to form a first set of user beams with an initial range for each of the user beams. In various embodiments, setting a gain value for a user beam includes or triggers setting one or more antenna gain values. Operation proceeds from step 320 via connecting node A 324 to step 326. In step 326 the first base station is operated to measure interference (e.g., UL RSSI) on each user beam of the first set of user beams during a first time period (e.g., T1). In some embodiments, the first base station is controlled to sweep through one or more iterations of the first set of beams during the first time period.

Step 326 includes steps 328, 330, 332, 334, 336 and 338. In step 328 the first base station measures an UL RSSI for user beam 1. Step 328 includes step 340 and step 342. In step 340 the first base station measures RTWP for user beam 1. Operation proceeds from step 340 to step 342. In step 342 the first base station averages the measured RTWP for user beam 1 to determine UL RSSI for user beam 1.

In step 330 the first base station measures an UL RSSI for user beam 2. Step 330 includes step 344 and step 346. In step 344 the first base station measures RTWP for user beam 2. Operation proceeds from step 344 to step 346. In step 346 the first base station averages the measured RTWP for user beam 2 to determine UL RSSI for user beam 2.

In step 332 the first base station measures an UL RSSI for user beam 3. Step 332 includes step 348 and step 350. In step 348 the first base station measures RTWP for user beam 3. Operation proceeds from step 348 to step 350. In step 350 the first base station averages the measured RTWP for user beam 3 to determine UL RSSI for user beam 3.

In step 334 the first base station measures an UL RSSI for user beam 4. Step 334 includes step 352 and step 354. In step 352 the first base station measures RTWP for user beam 4. Operation proceeds from step 352 to step 354. In step 354 the first base station averages the measured RTWP for user beam 4 to determine UL RSSI for user beam 4.

In step 336 the first base station measures an UL RSSI for user beam 5. Step 336 includes step 356 and step 358. In step 356 the first base station measures RTWP for user beam 5. Operation proceeds from step 356 to step 358. In step 358 the first base station averages the measured RTWP for user beam 5 to determine UL RSSI for user beam 5.

In step 338 the first base station measures an UL RSSI for user beam n (e.g., user beam 6). Step 338 includes step 360 and step 362. In step 360 the first base station measures RTWP for user beam n. Operation proceeds from step 360 to step 362. In step 360 the first base station averages the measured RTWP for user beam n to determine UL RSSI for user beam n.

Operation proceeds from step 326, via connecting node B 364, to step 366. In step 366, the first base station detects, based on user beam interference, interference over an acceptable level (e.g., a maximum user beam interference threshold H1) on one or more user beams. Step 366 includes steps 368, 370, 372, 374, 376, 378, 380, 382, 284, 386, 388, 390, 392, 394, 396, 398, 400 and 402.

In step 368 the first base station compares the UL RSSI for user beam 1 to the threshold value H1. If the UL RSS for user beam 1 is less than threshold H1, then operation proceeds from step 368 to step 370, in which the first base station determines that the level of interference on user beam 1 is acceptable. However, if the UL RSS for user beam 1 is not less than threshold H1, then operation proceeds from step 368 to step 372, in which the first base station determines that the level of interference on user beam 1 is not acceptable.

In step 374 the first base station compares the UL RSSI for user beam 2 to the threshold value H1. If the UL RSS for user beam 2 is less than threshold H1, then operation proceeds from step 374 to step 376, in which the first base station determines that the level of interference on user beam 2 is acceptable. However, if the UL RSS for user beam 2 is not less than threshold H1, then operation proceeds from step 374 to step 378, in which the first base station determines that the level of interference on user beam 2 is not acceptable.

In step 380 the first base station compares the UL RSSI for user beam 3 to the threshold value H1. If the UL RSS for user beam 3 is less than threshold H1, then operation proceeds from step 380 to step 382, in which the first base station determines that the level of interference on user beam 3 is acceptable. However, if the UL RSS for user beam 3 is not less than threshold H1, then operation proceeds from step 380 to step 384, in which the first base station determines that the level of interference on user beam 3 is not acceptable.

In step 386 the first base station compares the UL RSSI for user beam 4 to the threshold value H1. If the UL RSS for user beam 4 is less than threshold H1, then operation proceeds from step 386 to step 388, in which the first base station determines that the level of interference on user beam 4 is acceptable. However, if the UL RSS for user beam 4 is not less than threshold H1, then operation proceeds from step 386 to step 390, in which the first base station determines that the level of interference on user beam 4 is not acceptable.

In step 392 the first base station compares the UL RSSI for user beam 5 to the threshold value H1. If the UL RSS for user beam 5 is less than threshold H1, then operation proceeds from step 392 to step 394, in which the first base station determines that the level of interference on user beam 5 is acceptable. However, if the UL RSS for user beam 5 is not less than threshold H1, then operation proceeds from step 392 to step 396, in which the first base station determines that the level of interference on user beam 5 is not acceptable.

In step 398 the first base station compares the UL RSSI for user beam N (e.g., user beam 6) to the threshold value H1. If the UL RSS for user beam N is less than threshold H1, then operation proceeds from step 398 to step 400, in which the first base station determines that the level of interference on user beam N is acceptable. However, if the UL RSS for user beam N is not less than threshold H1, then operation proceeds from step 398 to step 402, in which the first base station determines that the level of interference on user beam N is not acceptable. In some embodiments, in the comparisons of steps 368, 374, 380, 386, 392 and 398 less than is replaced by less than or equal to.

Operation proceeds from step 366, via connecting node C 404 to step 406. In step 406 the first base station determines whether or not there are one or more user beams upon which interference was detected over the acceptable level. If there are one or more user beams upon which interference was detected over the acceptable level, then operation proceeds from step 406 to step 408; otherwise, operation proceeds from step 406, via connecting node G 432 to step 434.

In step 408 the first base station determines whether or not there is at least one of the one or more user beams upon which interference was detected over the acceptable level which can be range reduced. In some embodiments, there is a practical minimum operational range for implementing a user beam. If the determination of step 408 is that there is at least one of the one or more user beams upon which interference was detected over the acceptable level which can be range reduced, then operation proceeds from step 408 to step 410; otherwise, operation proceeds from step 408 to step 412.

In step 410 the first base station identifies the one or more user beams upon which interference was detected over the acceptable level which can be range reduced. Operation proceeds from step 410 to step 414. In step 414 the first base station reduces the range of the one or more user beams upon which interference was detected over the acceptable limit which can be range reduced. Step 414 includes step 416, which is performed for each user beam to be range reduced. In step 416 the first base station reduces a user beam gain value by $\Delta 1$ dBm for controlling the user beam, where $\Delta 1$ is predetermined gain reduction value. In various embodiments reducing a user beam gain values includes or triggers changing one or more antenna gain values. Operation proceeds from step 414, via connecting node D 418 to step 326, in which the first base station again measures interference (e.g., UL RSSI) for each of the user beams.

Returning to step 412, in step 412 the first base station identifies the one or more user beams upon which interference was detected over the acceptable limit, but which can not be further range reduced. Operation proceeds from step 412 to step 420 or step 426, e.g., depending upon the implementation. In step 420 the first base station modifies the shape or one or more user beams with optionally one or more of the user beams set to 0 (e.g., turned-off) to avoid a region of high interference (high UL RSSI). Step 420 includes step 422, which is performed for each user beam to be reshaped. In step 422 first base station changes user beam control parameters to reshape the user beam. Operation proceeds from step 420, via connecting node E 424 to step 326, in which the first base station again measures interference (e.g., UL RSSI) for each of the user beams.

Returning to step 426, in step 426 the first base station sets the range of the one or more user beams upon which interference was detected over the acceptable level but which cannot be further range reduced (while still maintaining a useful beam) to a range of 0 (e.g., turns off the beam(s)). Step 426 includes step 428, which is performed for each of the user beams to range reduced to a range of 0 (turned-off). In step 428 the first base station sets a user beam gain value to 0 for controlling the user beam. In various embodiments, setting a user beam gain value to 0 includes or triggers setting one or more antenna gain values to 0. Operation proceeds from step 426, via connecting node F 430, to step 326, in which the first base station again measures interference (e.g., UL RSSI) for each of the user beams.

In step 434, the first base station determines if there is at least one user beam set to a range of 0 (one user beam which has been turned-off). If there is at least one user beam set to a range of 0, then operation proceeds from step 434 to step 436, in which the first base station proceeds to attempt to reduce interference by making a timing adjustment, and operation proceeds from step 436 to step 440. However, if there is not at least one user beam set to a range of 0, then operation proceeds to either optional step 438 or to step 452. In optional step 438, the first base station decides to proceed to attempt to reduce interference by making a timing adjustment, and operation proceeds from step 438 to step 440.

In step 440 the first base station makes a timing adjustment in an attempt to reduce interference. Step 440 includes step 442 in which the first base station shifts timing of the first base station by an incremental amount, e.g., a predetermined $\Delta$ time shift value, in an attempt to achieve synchronization with an interfering device, e.g., a base station of a second network. Operation proceeds from step 440 to step 444, In step 444 the first base station measures interference (e.g., UL RSSI) on each user beam of the first set of user beams during a first time period (T1). (Similar operations to the operations of step 326.) Operation proceeds from step 444 to step 446. In step 446 the first base station detects, based on user beam interference, interference over an acceptable level (e.g., a maximum user beam interference threshold H1) on one or more user beams. (Similar operations to the operations of step 366.) Operation proceeds from step 446 to step 448.

In step 448 if there are one or more user beams upon which interference was detected over the acceptable level, then operation proceeds from step 448 to step 440, for another timing adjustment. However, in step 448 if there are not any user beams upon which interference was detected over the acceptable level, then operation proceeds from step 448 to step 450.

In step 450 the first base station communicates timing adjustment information to other base stations in the first network. Operation proceeds from step 450 to step 452. In step 452 the first base station communicates with user equipments (UEs) being services by the first base station using user beams set to final adjustment values.

Figure 4:
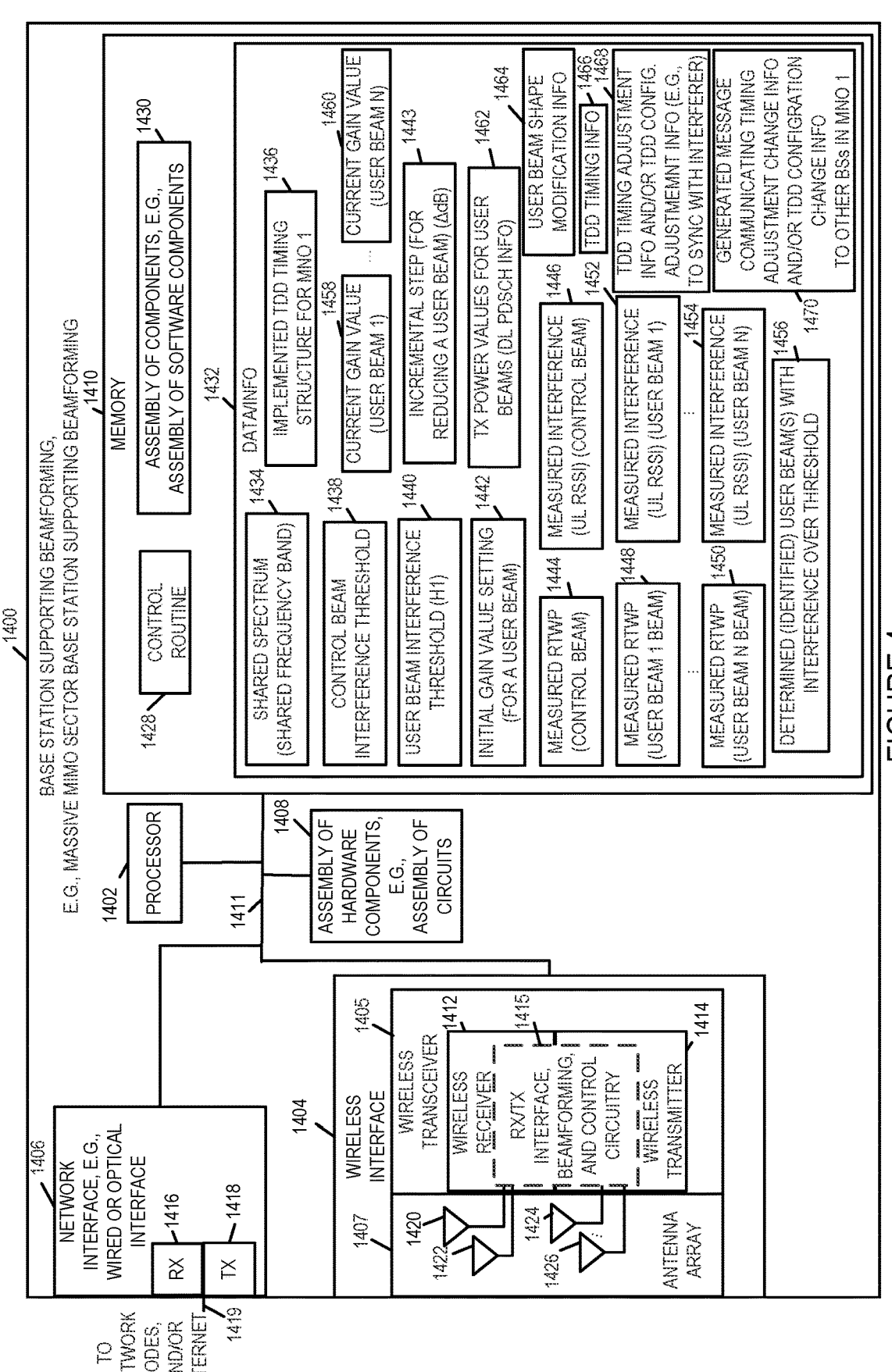
FIG. 4 is a drawing of an exemplary sector base station supporting beamforming, e.g., a massive multiple input multiple output (MIMO) sector base station supporting beamforming of a mobile network operator (MNO) network, said exemplary base station supporting interference detection and mitigation methods in accordance with an exemplary embodiment.

FIG. 4 is a drawing of an exemplary base station 1400 supporting beamforming, e.g., a massive multiple input multiple output (MIMO) sector base station supporting beamforming of a mobile network operator (MNO) network, said exemplary base station supporting interference detection and mitigation methods in accordance with an exemplary embodiment. Exemplary base station 1400 is, e.g., any of the base stations (108, 110, 112, 114, 116, . . . , 118) of MNO network 1 102 of system 100 of FIG. 1 and/or a base station implementing the method of flowchart 200 of FIG. 2 and/or the method of flowchart 300 of FIG. 3.

Exemplary base station 1400 includes a processor 1402, e.g., a CPU, a wireless interface 1404, a network interface 1406, an assembly of hardware components 1408, e.g., an assembly of circuits, and memory 1410 coupled together via a bus 1411 over which the various elements may interchange data and information.

Wireless interface 1404 includes a wireless transceiver 1405 and an antenna array 1407, e.g., a MIMO antenna array, which are coupled together. Wireless transceiver 1405 includes a wireless receiver 1412 and a wireless transmitter 1414. Wireless transceiver 1405 includes RX/TX interface, beamforming and control circuitry 1415. Portions of the RX/TX interface, beamforming and control circuitry 1415 are shared by both the wireless receiver 1412 and the wireless transmitter 1414. Antenna array 1407 includes a plurality of antenna or antenna elements (1420, 1422, 1424, . . . , 1426). The wireless interface 1404 can be configured for a control beam and for a set of user beams. Individual user beams can be, and sometimes are, configured for different ranges (e.g., reduced ranges) and/or different patterns, based on detected interference (e.g., measured UL RSSI on user beams) in accordance with an exemplary embodiment. Individual user beams can also be selectively turned off in accordance with an exemplary embodiment.

Network interface 1406, e.g., a wired or optical interface, includes a receiver (RX) 1416 and a transmitter (TX) 1418. The RX 1416 and the TX 1418 are coupled to interface connector 1419 which couples the base station 1400 to other network nodes, e.g., other base stations in the network, and/or the Internet.

Memory 1410 includes a control routine 1428, an assembly of components 1430, e.g., an assembly of software components, and data/information 1432. Control routine 1428 includes instructions which when loaded into and executed by a processor, e.g., processor 1402, control the base station 1400 to perform basic operational functions of the base station, e.g., access memory, store in memory, load a routine, control an interface, etc. Assembly of components 1430 includes, e.g., routines, subroutines, applications, code, etc., which when loaded into and executed by a processor, e.g., processor 1402, control the base station to perform steps of an exemplary method, e.g., steps of the method of flowchart 200 of FIG. 2 and/or steps of the method of flowchart 300 of FIG. 3.

Data/information 1432 includes information identifying shared spectrum 1434, e.g., a shared frequency band, for which interference is to be determined, information identifying an implemented time division duplexing (TDD) timing structure for MNO 1 network 1, a control beam interference threshold 1438, a user beam interference threshold (H1) 1440, an initial gain setting (for a user beam) 1442, and an incremental step value 1443 (for reducing a user beam), e.g., a ΔdB or ΔdBm value.

Memory 1410 further includes received total wideband power (RTWP) (control beam) measurement information 1444, a measured level of control beam interference 1446, e.g., a control beam UL RSSI value, RTWP user beam measurement information for each user beam (RTWP user beam 1 measurement information 1448, . . . , RTWP user beam N measurement information 1450), a measured level of user beam interference for each user beam (a measured level of interference detected on user beam 1 1452, e.g., a user beam 1 UL RSSI value, . . . , a measured level of interference detected on user beam N 1454, e.g., a user beam N UL RSSI value). Data/information 1432 further includes information 1456 identifying a determined, e.g., identified, set of one or more user beams on which interference was detected to be over the user beam interference threshold. Data/information 1432 further includes a current gain value setting for each user beam (current gain value setting for user beam 1 1458, . . . , current gain value setting for user beam N 1460). Data/information 1432 further includes an incremental step value 1443 (for reducing a user beam, e.g., a ΔdB value or a ΔdB value, and determined TX power values 1462 for user beams to be communicated in downlink physical downlink shared channel (DL PDSCH) information. Data/information 1432 further includes user beam shape modification information 1464, TDD timing information 1466, TDD timing adjustment information and/or TDD configuration adjustment information 1468, e.g., to synchronize with an interfering network, and a generated message 1470 communicating timing adjustment change information and/or TDD configuration change information to other base stations in MNO 1 network.

Figure 5:
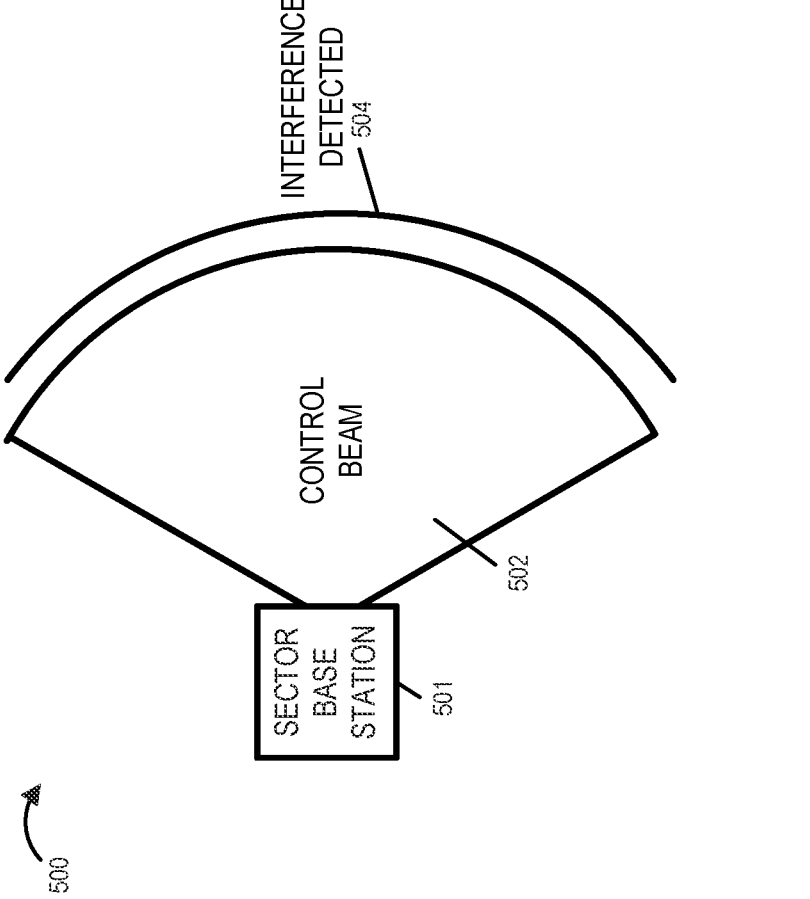
FIG. 5 is a drawing illustrating an exemplary sector base station configured for detecting and measuring interference on a control beam, in accordance with an exemplary embodiment.

FIG. 5 is a drawing 500 illustrating an exemplary sector base station 501 configured for detecting and measuring interference 504 on a control beam 502. Sector base station 501 is, e.g., any of the base station 108, 110, 112, . . . , 114, 116, 120 of network 1 102 of FIG. 1, a base station implementing the methods of flowchart 200 of FIG. 2, a base station implementing the method of flowchart 300 of FIG. 3, and/or base station 1400 of FIG. 4. The measured interference is compared to a control beam interference threshold to determine whether or not the base station is experiencing an acceptable level or an unacceptable level of interference.

Figure 6:
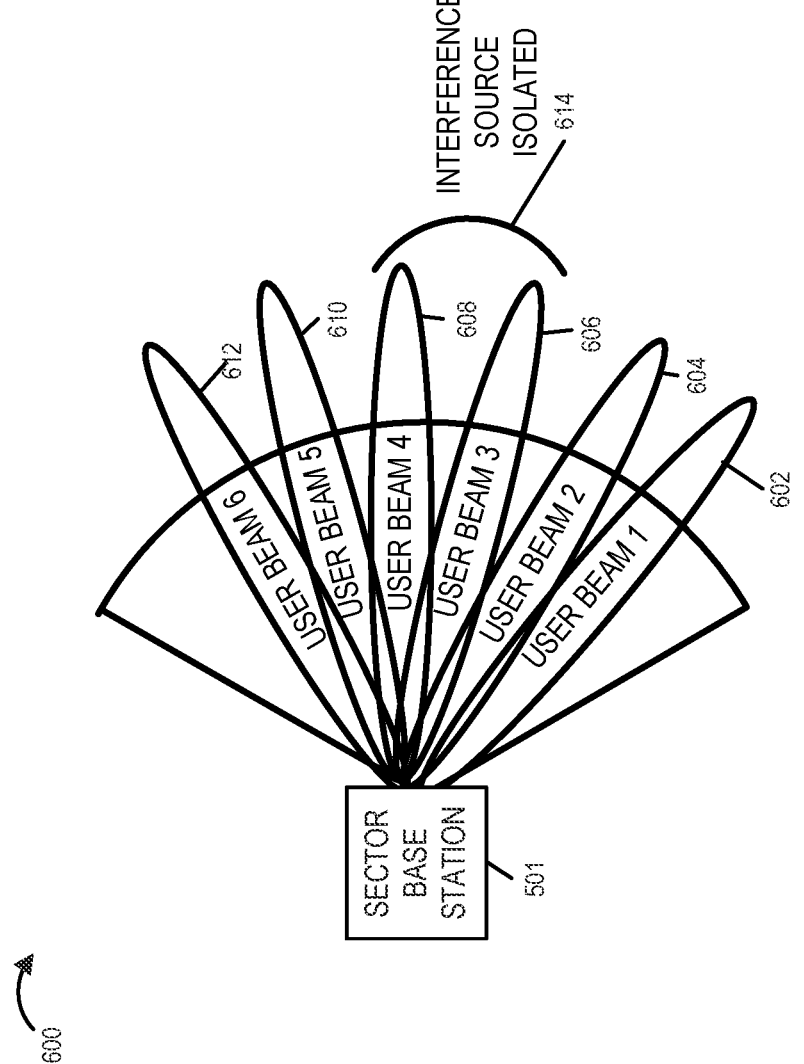
FIG. 6 is a drawing illustrating the exemplary sector base station of FIG. 5 configured for detecting and measuring interference on a set of user beams (user beam 1, user beam 2, user beam 3, user beam 4, user beam 5, user beam 6) and identifying user beams with a detected level of interference above an acceptable threshold, in accordance with an exemplary embodiment.

FIG. 6 is a drawing 600 illustrating an exemplary sector base station 501 configured for detecting and measuring interference on a set of user beams (user beam 1 602, user beam 2 604, user beam 3 606, user beam 4 608, user beam 5 610, user beam 6 612). In this example, base station 501 performs interference measurements and has detected interference above an acceptable user beam interference threshold on user beam 3 and user beam 4, as indicated by curved line 614, while the detected level of interference is considered to be acceptable on user beams 1, 2, 5 and 6.

Figure 7:
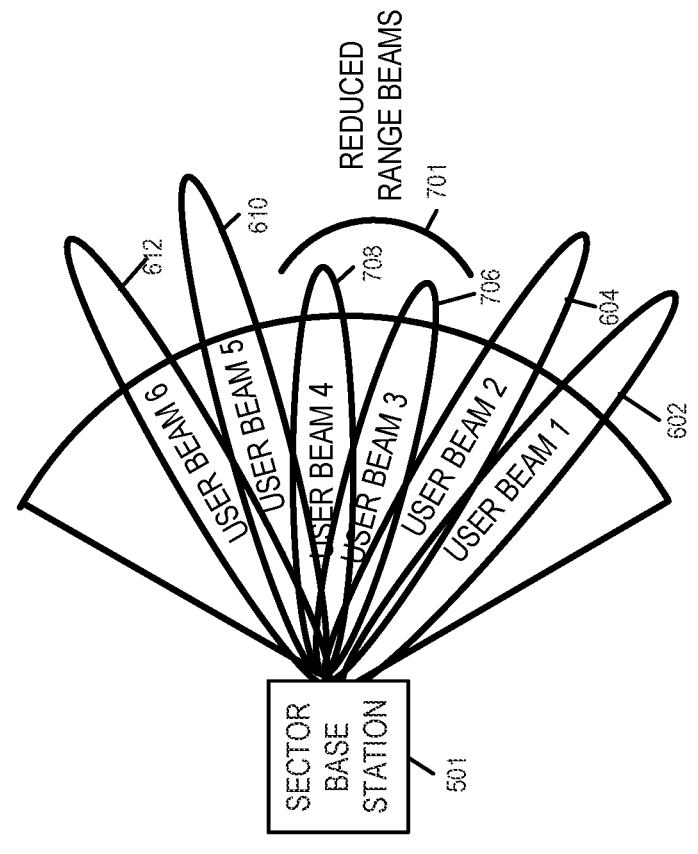
FIG. 7 is a drawing illustrating the exemplary sector base station of FIG. 5 configured for detecting and measuring interference on a set of user beams (user beam 1, user beam 2, user beam 3, user beam 4, user beam 5, user beam 6), in which user beam 3 and user beam 4 are reduced range user beams, with respect to user beam 3 and user beam 4 of FIG. 6, said range reduction having been performed in response to detected user beam interference levels above an acceptable threshold.

FIG. 7 is a drawing 700 illustrating exemplary sector base station 501 configured for detecting and measuring interference on a set of user beams (user beam 1 602, user beam 2 604, user beam 3 706, user beam 4 708, user beam 5 610, user beam 6 612). Curved line 701 identifies that user beam 3 706 and user beam 4 708 are reduced range user beams, with respect to user beam 3 606 and user beam 4 608 of FIG. 6. Each of the user beams (user beam 3 606 and user beam 4 608) were range reduced to obtain user beams (user beam 3 706, user beam 4 708) by changing, e.g., reducing, a gain setting used to control (configure) the user beams, e.g., by an incremental step amount. Subsequently, interference is measured on each of the user beams (user beam 1 602, user beam 2 604, user beam 3 706, user beam 4 708, user beam 5 610, user beam 6 612) and the interference measurements are compared to the acceptable user beam interference threshold, to determine which user beams (if any) have detected a level of interference above an acceptable user beam interference threshold.

Figure 8:
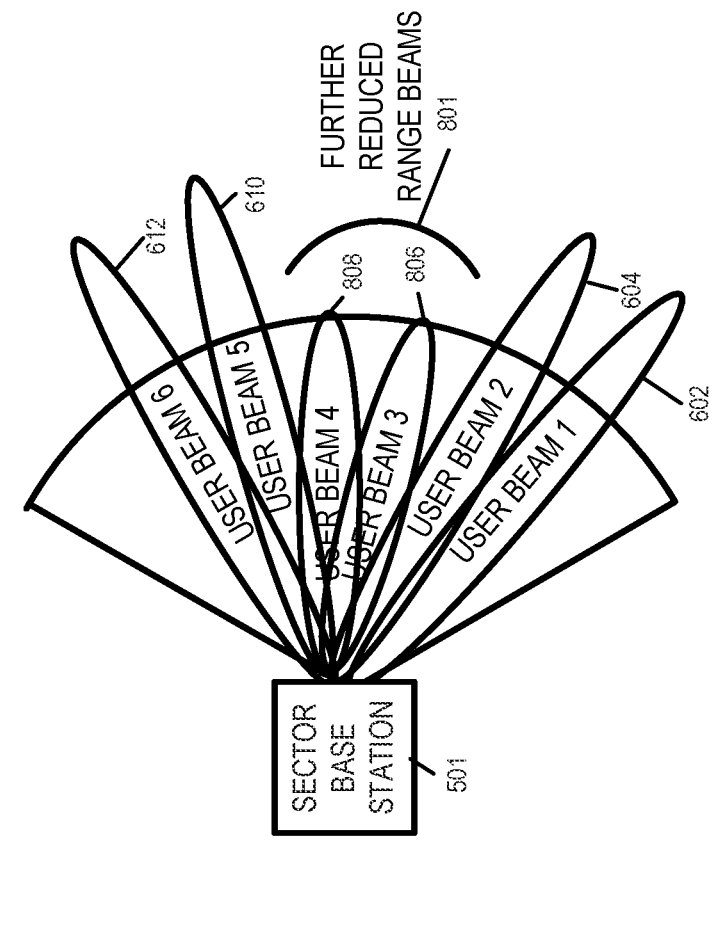
FIG. 8 is a drawing illustrating the exemplary sector base station of FIG. 5 configured for detecting and measuring interference on a set of user beams (user beam 1, user beam 2, user beam 3, user beam 4, user beam 5, user beam 6), in which user beam 3 and user beam 4 are reduced range user beams, with respect to user beam 3 and user beam 4 of FIG. 7, said range reduction having been performed in response to detected user beam interference levels above an acceptable threshold.

FIG. 8 is a drawing 800 illustrating exemplary sector base station 501 configured for detecting and measuring interference on a set of user beams (user beam 1 602, user beam 2 604, user beam 3 806, user beam 4 808, user beam 5 610, user beam 6 612). Curved line 801 identifies that user beam 3 806 and user beam 4 808 are further reduced range user beams, with respect to user beam 3 706 and user beam 4 708 of FIG. 7. Each of the user beams (user beam 3 706 and user beam 4 708) were range reduced to obtain user beams (user beam 3 706, user beam 4 808) by changing, e.g., reducing, a gain setting used to control (configure) the user beams, e.g. by an incremental step amount. Subsequently, interference is measured on each of the user beams (user beam 1 602, user beam 2 604, user beam 3 806, user beam 4 808, user beam 5 610, user beam 6 612), and the interference measurements are compared to the acceptable user beam interference threshold, to determine which user beams (if any) have detected a level of interference above an acceptable user beam interference threshold.

Figure 9:
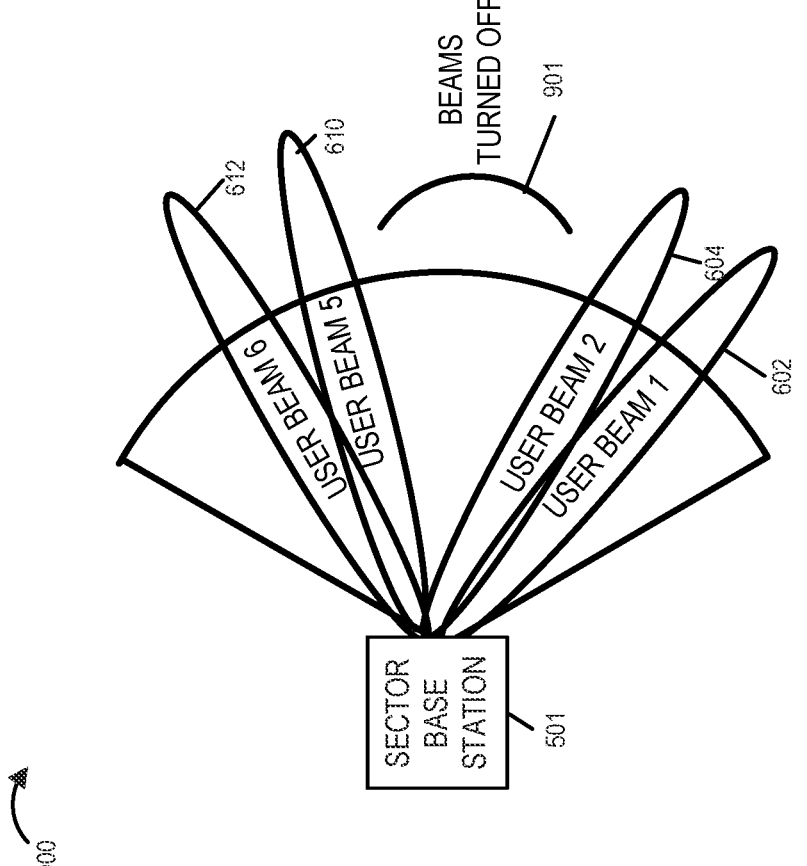
FIG. 9 is a drawing illustrating the exemplary sector base station of FIG. 5 configured for detecting and measuring interference on a set of user beams (user beam 1, user beam 2, user beam 5, user beam 6), in which user beam 3 and user beam 4 have been turned-off to reduce interference to be within an acceptable level and/or because further reduced range non-zero beams would not be practical.

FIG. 9 is a drawing 900 illustrating exemplary sector base station 501 configured for detecting and measuring interference on a set of user beams (user beam 1 602, user beam 2 604, user beam 5 610, user beam 6 612). Curved line 901 identifies that user beam 3 and user beam 4 have been turned-off, with respect to user beam 3 806 and user beam 4 808 of FIG. 8. In this example, it was determined that further incremental reduction to user beam 3 and user beam 4 would not produce user beams, which were considered beneficial (useful) for a practical level of communications (e.g., data throughput) over those user beams, between base station 501 and UEs being serviced by the base station 501. Subsequently, interference is measured on each of the remaining user beams (user beam 1 602, user beam 2 604, user beam 5 610, user beam 6 612), and the interference measurements are compared to the acceptable user beam interference threshold, to verify that the remaining user beams have detected acceptable interference levels.

Figure 10:
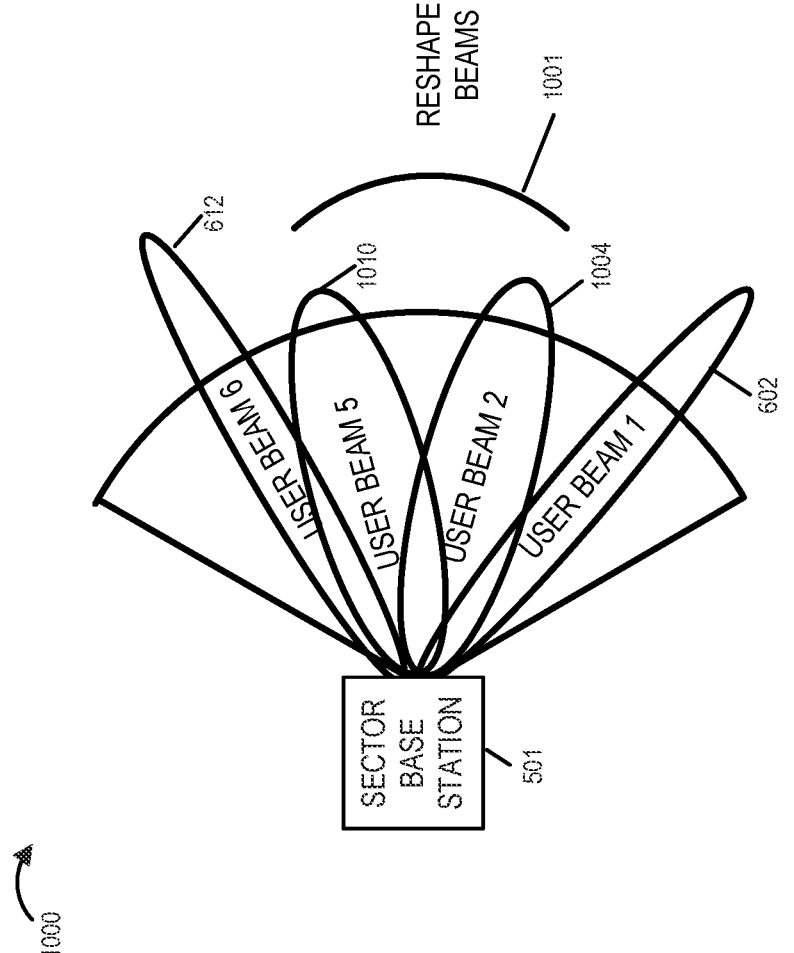
FIG. 10 is a drawing illustrating the exemplary sector base station of FIG. 5 configured for detecting and measuring interference on a set of user beams (user beam 1, user beam 2, user beam 5, user beam 6), in which user beam 3 and user beam 4 have been turned-off to reduce interference and user beam 2 and user beam 5 have been reshaped to achieve interference within an acceptable level for each of the user beams and to widen the overall base station coverage for communication with UEs being served by the base station over an approach in which beams 3 and 4 were turned-off without any reshaping of user beams 2 and 5.

FIG. 10 is a drawing 1000 illustrating exemplary sector base station 501 configured for detecting and measuring interference on a set of user beams (user beam 1 602, user beam 2 1004, user beam 5 1010, user beam 6 612). Curved line 1001 identifies that user beam 2 1004 and user beam 5 1010 are reshaped user beams with respect to pervious user beam 2 604 and previous user beam 5 610 and user beam 3 and user beam 4 have been turned-off. Reshaped user beam 2 1004 covers a portion of the area previously covered by deleted user beam 3. Reshaped user beam 5 1010 covers a portion of the area previously covered by deleted user beam 4.

In this example, it was determined that further incremental reduction to user beam 3 and user beam 4 would not produce user beams, which were considered beneficial (useful) for a practical level of communications (e.g., data throughput) over those user beams, between base station 501 and UEs being serviced by the base station 501. The reshaped user beams (user beam 2 1004, user beam 5 1010) allow more overall coverage by base station 108, than the approach of simply turning off user beams 3 and 4 and is beneficial in a case where the high level of interference is restricted within a narrow range (slice), e.g., a boundary portion where beam 3 and beam 4 meet or are very close to one another. Subsequently, interference is measured on each of the remaining user beams (user beam 1 602, user beam 2 1004, user beam 5 1010, user beam 6 612), and the interference measurements are compared to the acceptable user beam interference threshold, to determine which user beams (if any) have detected a level of interference above an acceptable user beam interference threshold.

Various aspects and/or features of some embodiments of the present invention are further described below. Conflict detection through interference measurement will now be described. In stage 1, the control beam is leveraged for overall interference detection. (See FIG. 5.) Operation proceeds from stage 1 to stage 2.

In stage 2, the direction of the interference is isolated by measuring the performance of user-beams. In various embodiments, the interference detection mechanism is measured UL RSSI over threshold h1 over a period t1. In some embodiments, t1 and h1 are tunable parameters at each sector in a massive-mimo capable radio. (See FIG. 6.)

Step 1 of conflict mitigation will now be described. In step 1, the transmit power is adjusted for one or more user beams on which unacceptable interference was detected (interference above the threshold h1). An incremental reduction of transmit power (e.g., in DL PDSCH) is applied in user beam(s) that detected the high UL RSSI in steps of Δ dB for a period of t2 (ms). In various embodiments Δ dB and t2 are tunable. The incremental reduction in transmit power for a user beam results in a range reduced user beam. (See FIG. 7 and FIG. 8).

Following an incremental reduction in transmit power for a beam (resulting in a reduced range user beam), a re-evaluation is performed to determine if the UL RSSI is over the h1 threshold over a period of t1. If interference persists, e.g., the interference remains above the h1 threshold on at least one user beam, after a predetermined amount of beam range reduction, e.g., a predetermined number of incremental reductions of transmit power for the user beam, then operation proceeds to step 2 of the conflict mitigation.

Step 2 of conflict mitigation will now be described. In step 2, the transmission direction is modified. The transmit power (e.g., in DL PDSCH) in beam(s)) is set=0 db (mute transmission) in the direction of the high interference (See FIG. 9) or beam shapes are modified to avoid the region of high UL RSSI for a period of t3 (tunable parameter) (See FIG. 10).

Following the conflict mitigation operation of turning off one or more user beams or modifying user beam shapes, a reevaluation is performed to determine if the UL RSSI is over the h1 threshold over a period of t1. If interference persists, then operation proceeds to step 3 of the conflict mitigation.

Step 3 of conflict mitigation will now be described. In step 3, time-division-duplexing (TDD) Sync alignment is performed. Assuming the interferer (e.g., a base station of a second network) is using a universal time coordinated (UTC) clock source, e.g., GPS, the TDD transmission/reception ratio of the base station (e.g., a base station of a first network) attempting to mitigate the interference problem, which it detected, is adjusted to match the interfering source. Thus, the TDD of the operator 1 (network 1) is adjusted to achieve synchronization with the TDD of operator 2 (network 2).

Continuous validation of UL RSSI being over h1 for a period of t1 is performed following each incremental TDD adjustment.

Once UL RSSI normalizes, e.g., the interference measurements on the user beams detect that the interference on each user beam is below the threshold h1, then operation proceeds to step 4.

In step 4, service is restored. At each of the steps above (1, 2, or 3) once UL RSSI has normalized (become acceptable), then service of the cell can be restored to designed/target area by enabling DL-PDCCH of the service beams to its designated power.

Numbered List of Exemplary Method Embodiments

Method Embodiment 1. A method of operating a first base station, the method comprising: measuring (212) interference received on user beams (e.g., during a first time period (t1) used for measuring interference on user beams) (e.g., measure received total wideband power (RTWP) for each user beam and determine UL received signal strength indicator (RSSI) (e.g., in dBm) for each user beam, where UL RSSIBeami=Average RTWPBeami); detecting (214), based on measured user beam interference, interference over an acceptable level (e.g., max user beam interference threshold (h1)) on one or more user beams; reducing (216) the range of the one or more user beams upon which interference was detected over the acceptable level (e.g., by reducing a user beam gain value in a step of Δ1 dB); measuring (218) interference received on the user beams after reducing the range of the one or more user beams upon which interference was detected over the acceptable level; and determining (220) if user beam interference is over the acceptable level on one or more of the user beams after reducing the range of the one or more user beams upon which interference was previously detected over the acceptable level; and taking (226 or 250) an interference mitigation action if it is determined that user beam interference remains over the acceptable level on one or more of the user beams.

Method Embodiment 1A. The method of Method Embodiment 1, wherein measuring (212) interference received on user beams includes measuring interference received on a first user beam, said measuring interference on the first user beam including: receiving wireless signals on the first user beam; measuring received total wideband power (RTWP) of the received wireless signals received on the first user beam; and averaging the RTWP for the first user beam to obtain an interference value (UL RSSI) for the first user beam.

Method Embodiment 2. The method of Method Embodiment 1, wherein said interference mitigation action includes: i) further reducing (230) the range of the one or more user beams upon which interference was detected to remain over the acceptable level or ii) making (252) at least one of a timing adjustment or TDD configuration adjustment in an attempt to reduce interference.

Method Embodiment 3. The method of Method Embodiment 2, further comprising: determining (222) if further range reduction is possible on at least one of the one or more user beams upon which interference was detected to remain over the acceptable level (e.g., was a beam power level reduced to the minimum amount without reaching an acceptable level of interference).

Method Embodiment 4. The method of Method Embodiment 3, wherein determining (222) if further range reduction is possible on at least one of the one or more user beams upon which interference was detected to remain over the acceptable level determines that (229) range reduction is possible on at least one of the one or more user beams upon which interference was detected to remain over the acceptable level, the method further comprising: in response to determining that (229) further range reduction is possible on at least one of the one or more user beams upon which interference was detected to remain over the acceptable level, performing (230) an additional beam range reduction operation; and measuring (238) interference received on the user beams after performing the additional beam range reduction operation; and determining (240) if user beam interference is over an acceptable level on one or more of the user beams after the additional beam range reduction operation.

Method Embodiment 5. The method of Method Embodiment 3, wherein determining (222) if further range reduction is possible on at least one of the one or more user beams upon which interference was detected to remain over the acceptable level determines that (231) range reduction is not possible on at least one of the one or more user beams upon which interference was detected to remain over the acceptable level, the method further comprising: in response to determining that (231) further range reduction is not possible on at least one of the one or more user beams upon which interference was detected to remain over the acceptable level (and determining that performance, e.g., data throughput and/or coverage is not acceptable (247)), making (252) said timing adjustment or said TDD configuration adjustment in an attempt to reduce interference.

Method Embodiment 6. The method of Method Embodiment 5, further comprising: measuring (254) interference received on the user beams after making said timing adjustment (e.g., shift timing used to control uplink/downlink timing) or said TDD configuration adjustment, said measuring being for a predetermined period of time; and determining (256) if user beam interference has become acceptable.

Method Embodiment 6A. The method of Method Embodiment 6, wherein said method includes making said timing adjustment, said timing adjustment being an advance or delay in base station timing.

Method Embodiment 6B. The method of Method Embodiment 6, wherein said method includes making said TDD configuration adjustment, said TDD configuration adjustment including at least one of: i) altering a number of uplink slots included in the TDD configuration being used; ii) altering the number of downlink slots in the TDD configuration being used; or ii) altering the location of uplink and downlink slots in the TDD configuration being used.

Method Embodiment 7. The method of Method Embodiment 6, further comprising: in response to determining that (261) user beam interference has not become acceptable, making (262) another timing adjustment or another TDD configuration adjustment.

Method Embodiment 8. The method of Method Embodiment 6, further comprising: in response to determining that (259) user beam interference has become acceptable; monitoring (260) user beam interference for a predetermined period of time; and determining (262) if user beam interference has remained acceptable for said predetermined period of time.

Method Embodiment 9. The method of Method Embodiment 8, wherein said first base station is part of a first network and wherein said interference includes interference from devices in a second network, the method further comprising: in response to determining that (267) said user beam interference has remained acceptable for said predetermined period of time, communicating (268) timing adjustment change information or TDD configuration change information to other base stations in said first network.

Method Embodiment 10. The method of Method Embodiment 1, further comprising: measuring (204) interference on a control beam prior to performing said step of measuring interference on said user beams.

Method Embodiment 11. The method of Method Embodiment 10, wherein said step of measuring (212) interference on user beams is initiated (208) in response to detecting (207) interference above an acceptable control channel interference threshold and is used to identify specific user beams corresponding to a direction from which unacceptable interference is being received.

Method Embodiment 12. The method of Method Embodiment 11, wherein said step of measuring interference on user beams is performed during a period of time in which the first base station is controlled not to transmit and UEs serviced by the first base station are controlled not to transmit to the first base station.

Method Embodiment 13. The method of Method Embodiment 1, wherein said base station is a sector base station supporting massive-multiple-in-multiple-out (MIMO).

Method Embodiment 14. The method of Method Embodiment 9, wherein said first network is a first mobile network operator (MNO) network and said second network is a second MNO.

Method Embodiment 15. The method of Method Embodiment 14, wherein said first network is using a first TDD timing structure and said second network is using a second TDD timing structure; and wherein said first network and second network are using at least some of the same mid-band spectrum.

Method Embodiment 16. The method of Method Embodiment 1, further comprising: operating (270) the first base station to communicate with UEs being serviced by the first base station using user beams set to final adjustment levels.

Numbered List of Exemplary Apparatus Embodiments

Apparatus Embodiment 1. A first base station (108, 110, 112, 114, 116, 118, 1400 or 501) comprising: a processor (1402) configured to operate the first base station to: measure (212) interference received on user beams (e.g., during a first time period (t1) used for measuring interference on user beams) (e.g., measure received total wideband power (RTWP) for each user beam and determine UL received signal strength indicator (RSSI) (e.g., in dBm) for each user beam, where UL RSSIBeami=Average RTWPBeami); detect (214), based on measured user beam interference, interference over an acceptable level (e.g., max user beam interference threshold (h1)) on one or more user beams; reduce (216) the range of the one or more user beams upon which interference was detected over the acceptable level (e.g., by reducing one or more user beam gain values in a step of Δ1 dB); measure (218) interference received on the user beams after reducing the range of the one or more user beams upon which interference was detected over the acceptable level; and determine (220) if user beam interference is over the acceptable level on one or more of the user beams after reducing the range of the one or more user beams upon which interference was previously detected over the acceptable level; and take (226 or 250) an interference mitigation action if it is determined that user beam interference remains over the acceptable level on one or more of the user beams.

Apparatus Embodiment 1A. The first base station of Apparatus Embodiment 1, further comprising: a wireless receiver (1412); and an antenna array (1407); and wherein said processor (1402) is configured to operate the first base station to: receive wireless signals (via antenna array 1407 and wireless receiver 1412) on the first user beam; measure received total wideband power (RTWP) of the received wireless signals received on the first user beam; and average the RTWP for the first user beam to obtain an interference value (UL RSSI) for the first user beam, as part of being configured to operate the first base station to measure (212) interference received on user beams.

Apparatus Embodiment 2. The first base station of Apparatus Embodiment 1, wherein said interference mitigation action includes: i) further reducing (230) the range of the one or more user beams upon which interference was detected to remain over the acceptable level or ii) making (252) at least one of a timing adjustment or TDD configuration adjustment in an attempt to reduce interference.

Apparatus Embodiment 3. The first base station of Apparatus Embodiment 2, wherein said processor (1402) is further configured to operate the first base station to: determine (222) if further range reduction is possible on at least one of the one or more user beams upon which interference was detected to remain over the acceptable level (e.g., was a beam power level reduced to the minimum amount without reaching an acceptable level of interference).

Apparatus Embodiment 4. The first base station of Apparatus Embodiment 3, wherein determining (222) if further range reduction is possible on at least one of the one or more user beams upon which interference was detected to remain over the acceptable level determines that (229) range reduction is possible on at least one of the one or more user beams upon which interference was detected to remain over the acceptable level, and wherein said processor is further configured to operate the first base station to: in response to determining that (229) further range reduction is possible on at least one of the one or more user beams upon which interference was detected to remain over the acceptable level, perform (230) an additional beam range reduction operation; and measure (238) interference received on the user beams after performing the additional beam range reduction operation; and determine (240) if user beam interference is over an acceptable level on one or more of the user beams after the additional beam range reduction operation.

Apparatus Embodiment 5. The first base station of Apparatus Embodiment 3, wherein determining (222) if further range reduction is possible on at least one of the one or more user beams upon which interference was detected to remain over the acceptable level determines that (231) range reduction is not possible on at least one of the one or more user beams upon which interference was detected to remain over the acceptable level, and wherein said processor is further configured to operate the first base station to: in response to determining that (231) further range reduction is not possible on at least one of the one or more user beams upon which interference was detected to remain over the acceptable level (and determining that performance, e.g., data throughput and/or coverage, is not acceptable (247)), make (252) said timing adjustment or said TDD configuration adjustment in an attempt to reduce interference.

Apparatus Embodiment 6. The first base station of Apparatus Embodiment 5, wherein said processor is further configured to operate the first base station to: measure (254) interference received on the user beams after making said timing adjustment (e.g., shift timing used to control uplink/downlink timing) or said TDD configuration adjustment, said measuring being for a predetermined period of time; and determine (256) if user beam interference has become acceptable.

Apparatus Embodiment 6A. The first base station of Apparatus Embodiment 6, wherein said processor is configured to operate the first base station to make said timing adjustment, said timing adjustment being an advance or delay in base station timing.

Apparatus Embodiment 6B. The first base station of Apparatus Embodiment 6, wherein said processor is configured to operate the first base station to make said TDD configuration adjustment, said TDD configuration adjustment including at least one of: i) altering a number of uplink slots included in the TDD configuration being used; ii) altering the number of downlink slots in the TDD configuration being used; or ii) altering the location of uplink and downlink slots in the TDD configuration being used.

Apparatus Embodiment 7. The first base station of Apparatus Embodiment 6, wherein said processor is further configured to operate the first base station to: in response to determining that (261) user beam interference has not become acceptable, make (262) another timing adjustment or another TDD configuration adjustment.

Apparatus Embodiment 8. The first base station of Apparatus Embodiment 6, wherein said processor is further configured to: in response to determining that (259) user beam interference has become acceptable; monitor (260) user beam interference for a predetermined period of time; and determine (262) if user beam interference has remained acceptable for said predetermined period of time.

Apparatus Embodiment 9. The first base station of Apparatus Embodiment 8, further comprising: a network interface transmitter (1418); and wherein said first base station (e.g., BS 108) is part of a first network (102) and wherein said interference includes interference from devices (158, 160, 162, 164, 166, 168, 170, 172, 174, 176, 178, 180, 182, 184, 186, 188, 190, 192) in a second network (104); and wherein said processor (1402) is further configured to operate the first base station to: in response to determining that (267) said user beam interference has remained acceptable for said predetermined period of time, communicate (268) (via network interface transmitter 1418) timing adjustment change information or TDD configuration change information to other base stations (110, 112, 114, 116, 118) in said first network (102).

Apparatus Embodiment 10. The first base station of Apparatus Embodiment 1, wherein said processor (1402) is further configured to operate the first base station to: measure (204) interference on a control beam prior to performing said step of measuring (212) interference on said user beams.

Apparatus Embodiment 11. The first base station of Apparatus Embodiment 10, wherein said step of measuring (212) interference on user beams is initiated (208) in response to detecting (207) interference above an acceptable control channel interference threshold and is used to identify specific user beams corresponding to a direction from which unacceptable interference is being received.

Apparatus Embodiment 12. The first base station of Apparatus Embodiment 11, wherein said step of measuring interference on user beams is performed during a period of time in which the first base station is controlled not to transmit and UEs serviced by the first base station are controlled not to transmit to the first base station.

Apparatus Embodiment 13. The first base station of Apparatus Embodiment 1, wherein said first base station is a sector base station supporting massive-multiple-in-multiple-out (mimo).

Apparatus Embodiment 14. The first base station of Apparatus Embodiment 9, wherein said first network (102) is a first mobile network operator (MNO) network and said second network (104) is a second MNO.

Apparatus Embodiment 15. The first base station of Apparatus Embodiment 14, wherein said first network (102) is using a first TDD timing structure and said second network (104) is using a second TDD timing structure; and wherein said first network (102) and second network (104) are using at least some of the same mid-band spectrum.

Apparatus Embodiment 16. The first base station (108) of Apparatus Embodiment 1, further comprising: a wireless transmitter (1414); a wireless receiver (1412); and wherein said processor (1402) is further configured to: operate (270) the first base station to communicate (via wireless transmitter 1414 and wireless receiver 1412) with UEs (UE 3 124 and UE 4 126) being serviced by the first base station (108) using user beams set to final adjustment levels.

Numbered List of Exemplary Non-Transitory
Computer Readable Medium Embodiments

Non-Transitory Computer Readable Medium Embodiment 1. A non-transitory computer readable medium (1410) including machine executable instructions, which when executed by a processor (1402) of a first base station (1400) control the first base station (1400) to perform the steps of: measuring (212) interference received on user beams (e.g., during a first time period (t1) used for measuring interference on user beams) (e.g., measure received total wideband power (RTWP) for each user beam and determine UL received signal strength indicator (RSSI) (e.g., in dBm) for each user beam, where UL RSSIBeami=Average RTWP-Beami); detecting (214), based on measured user beam interference, interference over an acceptable level (e.g., max user beam interference threshold (h1)) on one or more user beams; reducing (216) the range of the one or more user beams upon which interference was detected over the acceptable level (e.g., by reducing one or more user beam gain values in a step of Δ1 dB); measuring (218) interference received on the user beams after reducing the range of the one or more user beams upon which interference was detected over the acceptable level; and determining (220) if user beam interference is over the acceptable level on one or more of the user beams after reducing the range of the one or more user beams upon which interference was previously detected over the acceptable level; and taking (226 or 250) an interference mitigation action if it is determined that user beam interference remains over the acceptable level on one or more of the user beams.

Various embodiments are directed to apparatus, e.g., base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, etc., said device including a processor configured to implement one, multiple or all of the steps of one or more methods of the invention.

In some embodiments, the processor or processors, e.g., CPUs, of one or more devices, e.g., a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, MNVO base station, e.g., a CBSD, an MNO cellular base station, e.g., an eNB or a gNB, a HSS server, a UE device, or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first base station, the method comprising:
    measuring interference received on user beams;
    detecting, based on the measured interference received on user beams, interference over an acceptable level on a first set of user beams, said first set of user beams including one or more user beams;
    reducing a range of the one or more user beams in said first set of user beams;
    measuring interference received on said user beams after reducing the range of the one or more user beams in the first set of user beams; and
    determining if the measured interference, received on at least one of said user beams, after reducing the range of the one or more user beams in the first set of user beams, remains over the acceptable level; and
    taking an interference mitigation action if it is determined that the measured interference, received on at least one of said user beams after reducing the range of the one or more user beams in the first set of user beams, remains over the acceptable level.

2. The method of claim 1,
    wherein user beams, on which the measured received interference measured after reducing the range of the one or more user beams in the first set of user beams, remains over the acceptable level are a second set of user beams; and
    wherein said interference mitigation action includes:
    i) further reducing the range of user beams in the second set of user beams or ii) making at least one of a timing adjustment or time-division-duplexing (TDD) configuration adjustment in an attempt to reduce interference.

3. The method of claim 2, further comprising:
    determining if further range reduction is possible on at least one of the user beams in said second set of user beams.

4. The method of claim 3,
    wherein determining if further range reduction is possible on at least one of the user beams in said second set of user beams determines that range reduction is possible on at least one of the user beams in said second set of user beams, the method further comprising:
    in response to determining that further range reduction is possible on at least one of the user beams in said second set of user beams, performing an additional beam range reduction operation; and
    measuring interference received on the user beams after performing the additional beam range reduction operation; and
    determining if user beam interference is over an acceptable level on one or more of the user beams after the additional beam range reduction operation.

5. The method of claim 3,
    wherein determining if further range reduction is possible on at least one of the user beams in said second set of user beams determines that range reduction is not possible on at least one of the user beams in said second set of user beams, the method further comprising:
    in response to determining that further range reduction is not possible on at least one of the user beams in said second set of user beams, making said timing adjustment or said TDD configuration adjustment in an attempt to reduce interference.

6. The method of claim 5, further comprising:
    measuring interference received on the user beams after making said timing adjustment or said TDD configuration adjustment, said measuring being for a predetermined period of time; and
    determining if the measured interference received on the user beams after making said timing adjustment or said TDD configuration adjustment has become acceptable.

7. The method of claim 6, wherein said method includes making said timing adjustment, said timing adjustment being an advance or delay in base station timing.

8. The method of claim 7, wherein said method includes making said TDD configuration adjustment, said TDD configuration adjustment including at least one of: i) altering a number of uplink slots included in the TDD configuration being used; ii) altering the number of downlink slots in the TDD configuration being used; or ii) altering the location of uplink and downlink slots in the TDD configuration being used.

9. The method of claim 6, further comprising:
    in response to determining that the measured interference received on the user beams after making said timing adjustment or said TDD configuration adjustment has not become acceptable, making another timing adjustment or another TDD configuration adjustment.

10. The method of claim 6, further comprising:
    in response to determining that the measured interference received on the user beams after making said timing adjustment or said TDD configuration adjustment has become acceptable,
    monitoring user beam interference for a predetermined period of time; and
    determining if the monitored user beam interference has remained acceptable for said predetermined period of time.

11. The method of claim 10, wherein said first base station is part of a first network and wherein said interference includes interference from devices in a second network, the method further comprising:

in response to determining that the monitored user beam interference has remained acceptable for said predetermined period of time, communicating timing adjustment change information or TDD configuration change information to other base stations in said first network.

12. The method of claim 11, wherein said first network is a first mobile network operator (MNO) network and said second network is a second MNO;

wherein said first network is using a first TDD timing structure and said second network is using a second TDD timing structure; and wherein said first network and second network are using at least some of the same mid-band spectrum.

13. A first base station comprising:

a processor configured to operate the first base station to:

measure interference received on user beams;

detect, based on the measured interference received on user beams, interference over an acceptable level on a first set of user beams, said first set of user beams including one or more user beams;

reduce a range of the one or more user beams in said first set of user beams;

measure interference received on said user beams after reducing the range of the one or more user beams in said first set of user beams; and determine if the measured interference, received on at least one of said user beams, after reducing the range of the one or more user beams in the first set of user beams, remains over the acceptable level; and take an interference mitigation action if it is determined that the measured interference, received on at least one of the user beams after reducing the range of the one or more user beams in the first set of user beams, remains over the acceptable level.

14. The first base station of claim 13, wherein user beams, on which the measured received interference measured after reducing the range of the one or user beams in the first set of user beams, remains over the acceptable level are a second set of user beams; and wherein said interference mitigation action includes:

i) further reducing the range of user beams in the second set of user beams upon which interference was detected to remain over the acceptable level or ii) making at least one of a timing adjustment or time-division-duplexing (TDD) configuration adjustment in an attempt to reduce interference.

15. The first base station of claim 14, wherein said processor is further configured to operate the first base station to:

determine if further range reduction is possible on at least one of the user beams in said second set of user beams.

16. The first base station of claim 15, wherein determining if further range reduction is possible on at least one of the user beams in said second set of user beams determines that range reduction is possible on at least one of the user beams in said second set of user beams, and wherein said processor is further configured to operate the first base station to:

in response to determining that further range reduction is possible on at least one of the user beams in said second set of user beams, perform an additional beam range reduction operation; and measure interference received on the user beams after performing the additional beam range reduction operation; and determine if user beam interference is over an acceptable level on one or more of the user beams after the additional beam range reduction operation.

17. The first base station of claim 15, wherein determining if further range reduction is possible on at least one of the user beams in said second set of user beams determines that range reduction is not possible on at least one of the user beams in said second set of user beams, and wherein said processor is further configured to operate the first base station to:

in response to determining that further range reduction is not possible on at least one of the user beams in said second set of user beams, make said timing adjustment or said TDD configuration adjustment in an attempt to reduce interference.

18. The first base station of claim 17, wherein said processor is further configured to operate the first base station to:

measure interference received on the user beams after making said timing adjustment or said TDD configuration adjustment, said measuring being for a predetermined period of time; and determine if the measured interference received on the user beams after making said timing adjustment or said TDD configuration adjustment has become acceptable.

19. The first base station of claim 18, wherein said processor is further configured to operate the first base station to:

in response to determining that the measured interference received on the user beams after making said timing adjustment or said TDD configuration adjustment has not become acceptable, make another timing adjustment or another TDD configuration adjustment.

20. A non-transitory computer readable medium including machine executable instructions, which when executed by a processor of a first base station control the first base station to perform the steps of:

measuring interference received on user beams;

detecting, based on the measured interference received on user beams, interference over an acceptable level on a first set of user beams including one or more user beams;

reducing a range of the one or more user beams in the first set of user beams;

measuring interference received on said user beams after reducing the range of the one or more user beams in the first set of user beams; and determining if the measured interference received, received on at least one of said user beams, in the first set of user beams, after reducing the range of the one or more user beams in the first set of user beams, remains over the acceptable level; and taking an interference mitigation action if it is determined that the measured interference, received on at least one of the user beams after reducing the range of the one or more user beams in the first set of user beams, remains over the acceptable level.

* * * * *